United States Patent
Lee et al.

(10) Patent No.: US 12,037,659 B2
(45) Date of Patent: Jul. 16, 2024

(54) METHOD FOR SELECTIVE RECOVERY OF VALUABLE METAL FROM WASTE DENITRIFICATION CATALYST THROUGH ALKALI FUSION

(71) Applicant: Korea Institute Of Geoscience And Mineral Resources, Daejeon (KR)

(72) Inventors: Jin-Young Lee, Daejeon (KR);
Jung-Shin Kang, Daejeon (KR);
Hee-Nam Kang, Seosan-si (KR)

(73) Assignee: Korea Institute Of Geoscience And Mineral Resources, Daejeon (KR)

( * ) Notice: Subject to any disclaimer, the term of this patent is extended or adjusted under 35 U.S.C. 154(b) by 1212 days.

(21) Appl. No.: 16/633,257

(22) PCT Filed: Jul. 27, 2018

(86) PCT No.: PCT/KR2018/008523
§ 371 (c)(1),
(2) Date: Jan. 23, 2020

(87) PCT Pub. No.: WO2019/022555
PCT Pub. Date: Jan. 31, 2019

(65) Prior Publication Data
US 2021/0130928 A1 May 6, 2021

(30) Foreign Application Priority Data

Jul. 27, 2017 (KR) .......................... 10-2017-0095357

(51) Int. Cl.
*C22B 34/36* (2006.01)
*C22B 1/16* (2006.01)
(Continued)

(52) U.S. Cl.
CPC .............. *C22B 34/365* (2013.01); *C22B 1/16* (2013.01); *C22B 3/12* (2013.01); *C22B 7/008* (2013.01); *C22B 7/009* (2013.01); *C22B 34/124* (2013.01)

(58) Field of Classification Search
CPC ........... C22B 34/365; C22B 1/16; C22B 3/12; C22B 7/008; C22B 7/009; C22B 34/124
(Continued)

(56) References Cited

U.S. PATENT DOCUMENTS 4,168,296 A 9/1979 Lundquist
2008/0131343 A1 6/2008 Oogjen et al.

FOREIGN PATENT DOCUMENTS

CN 103028394 A 4/2013
CN 105002361 A 10/2015
(Continued)

OTHER PUBLICATIONS

Office Action issued Jun. 2, 2021 in Chinese Application No. 201880048569.1.
(Continued)

*Primary Examiner* — Melissa S Swain
(74) *Attorney, Agent, or Firm* — Harness, Dickey & Pierce, P.L.C.

(57) ABSTRACT

The present invention provides a method for selective recovery of a valuable metal from a waste denitrification catalyst through alkali fusion, the method comprising the steps of: (a) adding an alkali metal to a waste denitrification catalyst, followed by mixing and alkali fusion, to generate a calcination product; (b) subjecting the calcination product to water-leaching to recover an alkali leachate and a residue; (c) adding a precipitator to the alkali leachate, followed by stirring, to recover calcium metavanadate $(Ca(VO_3)_2)$ or calcium tungstate $(CaWO_4)$ through precipitation; and (d)
(Continued)

subjecting the recovered calcium tungstate to acid decomposition to prepare tungstic acid. Therefore, vanadium and tungsten can be recovered at high efficiency by a method in which a precipitator is added to a leachate, which is obtained by adding an excess amount of an alkali metal to a waste denitrification catalyst and carrying out calcination and water-leaching, and then a reaction rate is controlled.

13 Claims, 24 Drawing Sheets

(51) Int. Cl.
*C22B 3/12* (2006.01)
*C22B 7/00* (2006.01)
*C22B 34/12* (2006.01)

(58) Field of Classification Search
USPC .......................................................... 423/55
See application file for complete search history.

(56) References Cited

FOREIGN PATENT DOCUMENTS

| | | |
|---|---|---|
| CN | 105648241 A | 6/2016 |
| CN | 105969991 A | 9/2016 |
| JP | H04-114747 B2 | 4/1992 |
| JP | 2009-511755 A | 3/2009 |
| KR | 100554403 B1 | 2/2006 |
| KR | 100573004 B1 | 4/2006 |
| KR | 101281579 B1 | 7/2013 |
| KR | 10-2014-0104254 A | 8/2014 |
| KR | 101452179 B1 | 10/2014 |
| WO | WO-2014/047728 A1 | 4/2014 |

OTHER PUBLICATIONS

Notice of Reasons for Refusal issued Feb. 2, 2021 in Japanese Application No. 2020-503954.
Extended European Search Report issued Apr. 7, 2021 in European Application No. 18839016.5.
International Search Report PCT/ISA/210 for International Application No. PCT/KR2018/008523 dated Nov. 26, 2018.

METHOD FOR SELECTIVE RECOVERY OF VALUABLE METAL FROM WASTE DENITRIFICATION CATALYST THROUGH ALKALI FUSION

CROSS-REFERENCE TO RELATED APPLICATIONS

This application is a national phase under 35 U.S.C. § 371 of PCT International Application No, PCT/KR2018/008523 which has an International filing date of Jul. 27, 2018, which claims priority to Korean Application No. 10-2017-0095357, filed Jul. 27, 2017, the entire contents of each of which are hereby incorporated by reference.

TECHNICAL FIELD

The present disclosure relates to a method for recovering valuable metals through which vanadium, tungsten, and titanium may be selectively recovered from a waste denitrification catalyst.

BACKGROUND ART

Recently, air pollutants emitted from various types of power plants, incineration plants, and chemical plants cause a problem with increasing interests in climate changes and global warming around the world. In particular, regulation on nitrogen oxide (hereinafter; referred to as "NOx") is strengthened because nitrogen oxides is harmful to human body and is also a representative air pollutant that cause various types of environmental problems such as ozone generation and acid rain in the atmosphere.

Selective catalytic reduction (SCR) is a most commonly used method as an example of a NOx control method to discharge NOx from power plants. This method is efficient, selective, and economical. In Korea, in the case of power plants, use scale of denitrification catalysts is more than about 20,000 $m^3$ (since 2010), and use thereof is increasing every year.

Denitrification catalysts generate waste after 3 to 4 years of use and 2 to 3 times of regenerations, and opportunity cost of usable valuable metals in the catalyst is increased when a total amount thereof is wasted. The waste denitrification catalyst contains about 1 to 1.5% (w/w) of vanadium and about 10% (w/w) of tungsten and various kinds of valuable metals such as titanium, aluminum, and silicon.

In general, acid and alkali leaching methods are used to recover valuable metals of the spent catalysts, but $V_2O_5$ and $WO_3$ contained in waste denitrification catalysts are difficult to be extracted by general acid leaching, and soda-calcination and water leaching processes are required.

The related art document, i.e., Korean Patent No. 1281579 (published on Jul. 3, 2013) invented by the present inventors, discloses a method of leaching valuable metals contained in a waste denitrification catalyst through calcinations and water leaching.

According to the above patent, each of vanadium and tungsten may be recovered in a form of oxide, but energy efficiency thereof is low due to an increase in calcination time, and as no means to additionally separate and recover titanium dioxide are provided, and thus, the valuable metals may not be selectively separated and recovered.

Therefore, a method for selectively recovering, from waste denitrification catalysts, valuable metals including titanium is required to ne urgently developed.

DISCLOSURE

Technical Problem

Accordingly, the present disclosure provides a method for recovering a valuable metal from a waste denitrification catalyst, for example, a method for effectively recovering various types of valuable metals by selecting alkali metals and leaching processes and adjusting a reaction rate thereof during a precipitation process.

In particular, the present disclosure provides a method for separating titanium dioxide during a recovery process of vanadium and tungsten, where titanium dioxide is difficult to be recovered through an acid and alkali leaching method in related art.

The problems to be solved by the present disclosure are not limited to the above-mentioned problem(s) and other problem(s) which are not mentioned will be clearly understood by the skilled person in the art based on a description below.

Technical Solution

In order to solve the above problems, the present disclosure provides a method for selectively recovering valuable metals from a waste denitrification catalyst through alkali fusion, where the method may include (a) adding an alkali metal to the waste denitrification catalyst, followed by mixing and alkali fusion, to generate a calcination product; (b) subjecting the calcination product to water-leaching to recover an alkali leachate and a residue; (c) adding a precipitator to the alkali leachate, followed by stirring, to recover calcium metavanadate ($Ca(VO_3)_2$) or calcium tungstate ($CaWO_4$) through precipitation; and (d) subjecting the recovered calcium tungstate to acid decomposition to prepare tungstic acid.

The alkali metal may also be added in an amount of 1.1 to 2 equivalents based on 1 equivalent of the waste denitrification catalyst.

The alkali metal may also be sodium carbonate ($Na_2CO_3$) or sodium hydroxide (NaOH).

During the alkali fusion, calcination may also be performed at an output of 1 kW per 100 g of waste denitrification catalyst when microwaves are used.

During the alkali fusion, the calcination may also be performed for 20 to 60 minutes at 900° C. to 1000° C.

The precipitator may also be calcium chloride ($CaCl_2$).

pH may also be adjusted by adding the precipitator and further adding strong alkaline calcium hydroxide [$Ca(OH)_2$].

Stirring may also be performed at 200 to 600 rpm for 30 minutes to 2 hours after the addition of the precipitator.

Further, when the alkali metal is sodium hydroxide and sodium hydroxide in the alkaline leachate has a concentration of 0.5 to 0.75 mol/L, a precipitator is added in order for 1.0 to 1.5 equivalents of calcium to be added and reacted to thereby precipitate calcium metavanadate with precipitation efficiency 99% or more.

Further, when the alkali metal is sodium hydroxide and the sodium hydroxide in the alkali leachate has a concentration of 0.5 mol/L or less, a precipitator is added in order for 1.0 equivalent or less of calcium to be added, and reacted to thereby precipitate calcium tungstate with a precipitation efficiency of 1% or less.

Further, a precipitator is added to the alkaline leachate, stirred, and is reacted with the alkaline leachate. The reaction is carried out at 333 K to 353 K for 15 minutes or less to precipitate calcium metavanadate, and the reaction may be carried out for 1 hour to 2 hour at 313 K to 353 K to precipitate calcium tungstate.

Meanwhile, the present disclosure may further include recovering the residue, (i) acid leaching by adding sulfuric acid or hydrochloric acid to the residue; (ii) adding sodium hydroxide to the acid leachate and reacting to precipitate meta titanic acid ($TiO(OH)_2$); and (iii) calcining the metatitanic acid to recover titanium dioxide.

The acid leaching may also be performed for 2 to 3 hours at 323 K to 333 K.

Further, a leaching rate may be 99% or more by adjusting pH to be 2 or less during adding and reacting with the sodium hydroxide.

Further, the calcination may be performed at 850 K to 900 K for 4 hours to 5 hours.

Advantageous Effects

According to the present disclosure, vanadium and tungsten can be recovered at high efficiency by a method in which a precipitator is added to a leachate, which is obtained by adding an excess amount of an alkali metal to a waste denitrification catalyst and carrying out calcination and water-leaching, and then a reaction rate is controlled.

It is also possible to additionally separate and recover titanium dioxide, which has not been effectively recovered through an acid and alkali leaching method by soda calcination in related art.

It is also possible to selectively determine the recovery of vanadium, tungsten, and titanium dioxide for each valuable metal in one process.

It is also possible to greatly shorten a reaction time during the alkali fusion and precipitation to significantly improve an entire efficiency of a valuable metal recovery process.

BEST MODE

Figure 1:
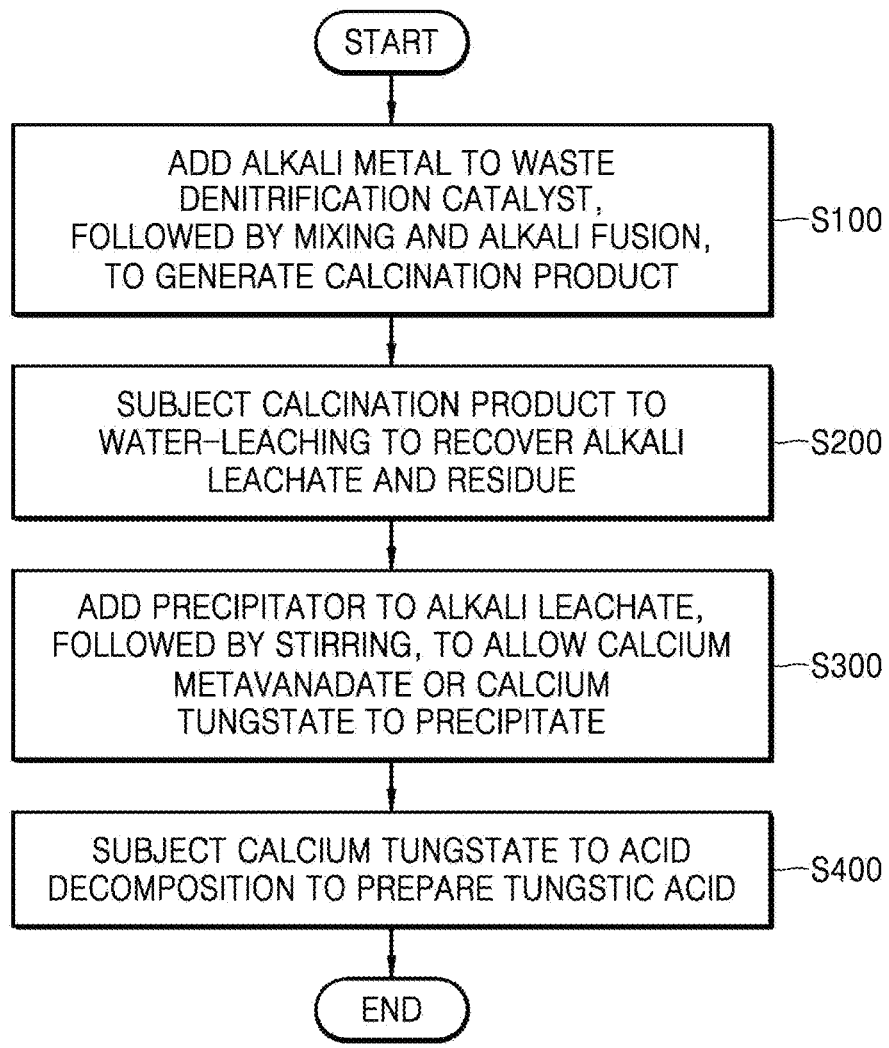
FIG. 1 shows a process flow of a selective valuable metal recovery method from a waste denitrification catalyst through alkali fusion according to an embodiment of the present disclosure.

FIG. 1 shows a process flow of a selective valuable metal recovery method from a waste denitrification catalyst through alkali fusion according to an embodiment of the present disclosure.

Referring to FIG. 1, the selective valuable metal recovery method from the waste denitrification catalyst through the alkali fusion includes: (a) adding an alkali metal to a waste denitrification catalyst, followed by mixing and alkali fusion, to generate a calcination product; (b) subjecting the calcination product to water-leaching to recover an alkali leachate and a residue; (c) adding a precipitator to the alkali leachate, followed by stirring, to recover calcium metavanadate ($Ca(VO_3)_2$) or calcium tungstate ($CaWO_4$) through precipitation; and (d) subjecting the recovered calcium tungstate to acid decomposition to prepare tungstic acid.

[Mode]

Preferred embodiments of the present disclosure are described below in detail with reference to the accompanying drawings.

Advantages and features of the present disclosure, and a method of achieving the same will be apparent with reference to embodiments described below in detail with reference to the accompanying drawings.

The present disclosure is not limited to the embodiments disclosed below, but may be implemented in various manners, and these embodiments are provided so that this disclosure will be thorough and complete, and will fully convey the scope of the invention to those skilled in the art. The present disclosure is merely defined by the scope of claims.

Further, in the description of the present disclosure, when it is determined that related known technology may obscure the gist of the present disclosure, detailed description thereof is omitted.

FIG. 1 shows a process flow of a selective valuable metal recovery method from a waste denitrification catalyst through alkali fusion according to an embodiment of the present disclosure.

Referring to FIG. 1, the selective valuable metal recovery method from the waste denitrification catalyst through the alkali fusion includes: (a) adding an alkali metal to a waste denitrification catalyst, followed by mixing and alkali fusion, to generate a calcination product; (b) subjecting the calcination product to water-leaching to recover an alkali leachate and a residue; (c) adding a precipitator to the alkali leachate, followed by stirring, to recover calcium metavanadate ($Ca(VO_3)_2$) or calcium tungstate ($CaWO_4$) through precipitation; and (d) subjecting the recovered calcium tungstate to acid decomposition to prepare tungstic acid.

A waste denitrification catalyst is prepared and alkali metal is added thereto and is mixed therewith to produce a calcination product through alkali fusion (S100).

The waste denitrification catalyst may be crushed to have a thickness of 100 μm or less and may be dried in an oven to remove moisture.

The waste denitrification catalyst includes vanadium (V) and tungsten (W) in the form of oxides ($V_2O_5$ and $WO_3$), and may contain a large amount of titanium dioxide ($TiO_2$).

The alkali fusion refers to a process in which the waste denitrification catalyst is calcined with the alkali metal, which is a strong alkali, and an excessive amount of alkali metal is added, up to 2 equivalents of alkali metal with respect to the equivalent of the waste denitrification catalyst to be reacted to thereby change insoluble compounds, for example, vanadium oxide and tungsten oxide into water-soluble compounds and power used for calcination may be adjusted using an electric furnace or based on microwave with which an amount of supplied power to significantly improve the energy efficiency of the calcination.

The alkali metal may be sodium carbonate ($Na_2CO_3$) or sodium hydroxide (NaOH).

The alkali metal corresponds to a strong alkali in an aqueous solution and conditions of the alkali fusion, for example, each of equivalents of added alkali metal, calcination temperatures and calcination time may be different depending on the selection of the alkali metal.

During the alkali fusion, the calcination product may be prepared according to Reaction formula 1 or Reaction formula 2 below.

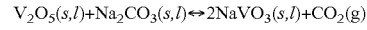

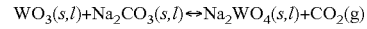

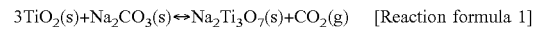 [Reaction formula 1]

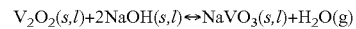

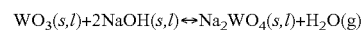

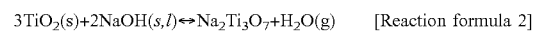 [Reaction formula 2]

The insoluble oxides of $V_2O_5$ and $WO_3$ are converted into water-soluble compounds of $NaVO_3$ and $Na_2WO_4$.

1.1 to 2 equivalents of alkali metal may be added with respect to 1 equivalent of waste denitrification catalyst.

In one embodiment of the present disclosure, the alkali metal is sodium hydroxide (NaOH) and 1.2 equivalents of sodium hydroxide (NaOH) is added with respect to the waste denitrification catalyst. In that case, the tungsten has a leaching rate of a maximum of 87.5% when being calcined at 1000° C. for 20 minutes and a maximum of 91.3% when being calcined at 900° C. for 60 minutes.

When the alkali metal is sodium carbonate ($Na_2CO_3$), sodium carbonate ($Na_2CO_3$) is added in an amount of 1.2 equivalents, and can be calcined at 1000° C. for 20 minutes to provide 99.8% of tungsten leaching rate.

During the alkali fusion, the calcination may be performed using an electric furnace or based on microwave.

When the microwave is used, the leaching rates of tungsten and vanadium may be efficiently determined by accurately adjusting the power supply amount with respect to the equivalent thereof.

When the microwave is used, the calcination may be performed at an output of 1 kW per 100 g of the waste denitrification catalyst.

In one embodiment of the present disclosure, when 300 g of waste denitrification catalyst is calcined at an output of 3 kW, 1.2 equivalents of sodium hydroxide is added to be calcined for 20 minutes, and thus, tungsten exhibits a leaching rate of up to 100%, and when 2 equivalents of sodium hydroxide is added to be calcined for 60 minutes, the leaching rate of each of tungsten, vanadium, and titanium dioxide may be adjusted to become a maximum leaching rate.

In another embodiment, when 300 g of waste denitrification catalyst is calcined at an output of 3 kW, 1.2 equivalents of sodium carbonate is added to be calcined for 40 minutes to maximize the leaching rate of each of tungsten and vanadium, and when 2.0 equivalents is added to be calcined for 60 minutes, the leaching rate of each of tungsten, vanadium, and titanium dioxide may be adjusted to become a maximum leaching rate.

During the alkali fusion, the calcination may be performed from 900° C. to 1000° C. for 20 to 60 minutes.

Therefore, the equivalent of the alkali metal which is a strong alkali is adjusted with respect to the waste denitrification catalyst and the calcination temperature and time are adjusted based on the determined power amount required for calcination to effectively determine the leaching rates of tungsten and vanadium (W/V) and the leaching rate of titanium dioxide to thereby selectively recover the valuable metals.

Subsequently, the calcination product is water leached to recover the alkali leachate and the residue (S200).

The calcination product is obtained by converting an insoluble compound into a water-soluble compound.

The alkali leachate may contain water-soluble $NaVO_3$ and $Na_2WO_4$ and the residue may contain sodium titanate, for example, $Na_2TiO_3$ or $Na_2Ti_3O_7$.

Tungsten and vanadium may be recovered by precipitating the alkali leachate, and the residue is acid leached to produce a hydrated titanium dioxide intermediate, and thus, each of valuable metals may be selectively separated through the precipitation process.

The precipitator is added to the alkaline leachate and stirred to precipitate calcium metavanadate $Ca(VO_3)_2]$ or calcium tungstate ($CaWO_4$) (S300).

The precipitator may be calcium chloride ($CaCl_2$).

The calcium chloride allows separation and recovery of each of the two metals from the leachate by adjusting the leaching rates of tungsten and vanadium through calcium.

If the precipitator is calcium chloride, it is precipitated according to Reaction formula 3 below.

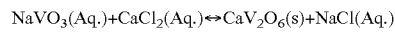

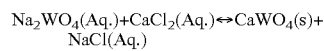

[Reaction formula 3]

The pH may be adjusted by adding the precipitator and further adding strong alkaline calcium hydroxide [$Ca(OH)_2$].

At this time, the pH may be adjusted to 13.25 to precipitate calcium metavanadate, and calcium tungstate may be precipitated at a pH of 13 or less.

Stirring after adding the precipitator may be performed at 200 to 600 rpm for 30 minutes to 2 hours.

It is desirable to form the precipitate by stirring and reacting in the above range, and within the above range, there are no significant changes in the precipitation efficiency and the reaction time depending on the stirring speed and the stirring time.

In one embodiment of the present disclosure, when the alkali metal is sodium hydroxide and sodium hydroxide in the alkaline leachate has a concentration of 0.5 to 0.75 mol/L, a precipitator is added in order for 1.0 to 1.5 equivalents of calcium to be added, and reacted, to thereby obtain 99% or more of the precipitation efficiency of calcium metavanadate.

In another embodiment of the present disclosure, when the alkali metal is sodium hydroxide and sodium hydroxide in the alkaline leachate has a concentration of 0.5 mol/L or less, a precipitator is added in order for calcium of 1.0 equivalent or less to be added and reacted to thereby precipitate the calcium tungstate with a recovery rate of 1% or less.

Therefore, the precipitation efficiency of each of tungsten and vanadium may be determined based on the equivalent of calcium in calcium chloride as a precipitator and the concentration of sodium hydroxide in the alkaline leachate to be selectively recovered.

Meanwhile, a precipitator is added to the alkaline leachate, stirred, and reacted. The reaction was carried out at 333 K to 353 K for 15 minutes or less to precipitate calcium metavanadate, and the reaction was carried out at 313 K to 353 K for 1 hour to 2 hours to precipitate calcium tungstate.

As the precipitation reaction rates are different from each other under the above temperature conditions, each of vanadium and tungsten may be separated even at room temperatures.

Figure 2:
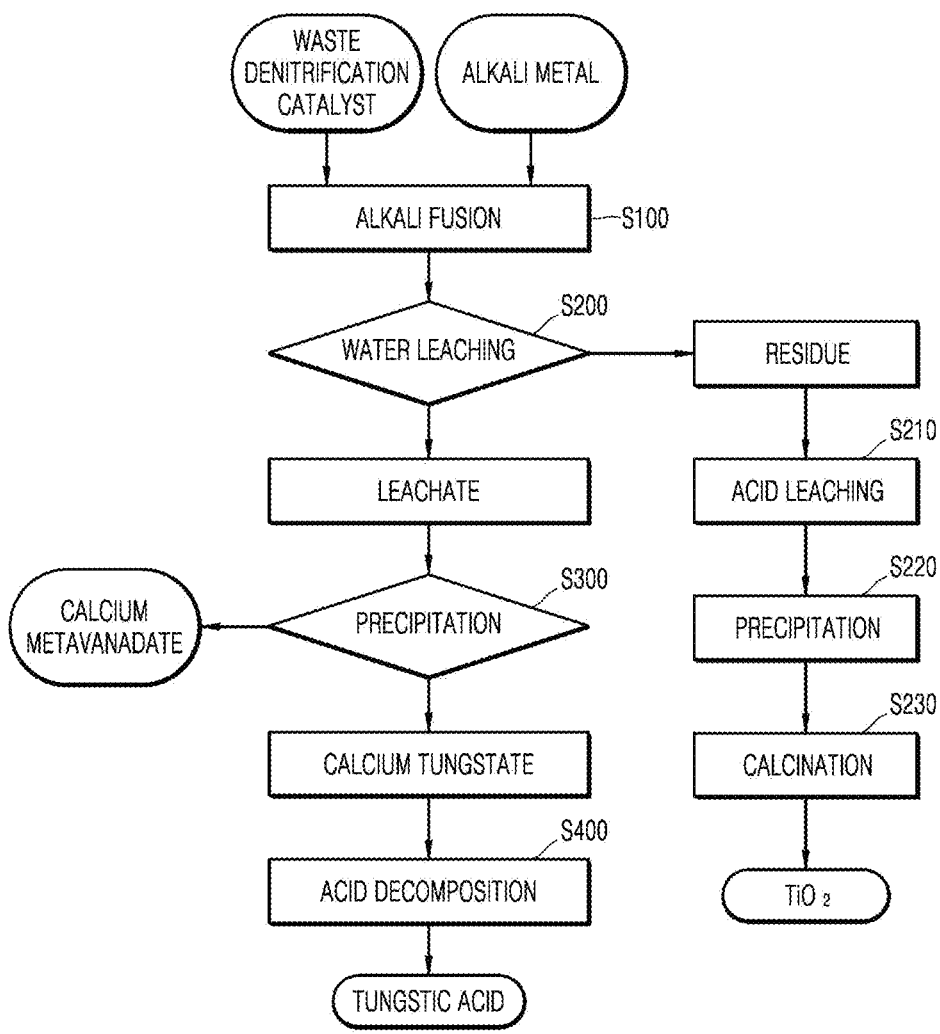
FIG. 2 shows a process flow of a selective valuable metal recovery method from a waste denitrification catalyst through alkali fusion according to another embodiment of the present disclosure.

FIG. 2 shows a process flow of a selective valuable metal recovery method from a waste denitrification catalyst through alkali fusion according to another embodiment of the present disclosure.

Referring to FIG. 2, according to another embodiment of the present disclosure, the selective valuable metal recovery method from the waste denitrification catalyst through alkaline fusion further includes recovering the residue, (i) acid leaching by adding sulfuric acid or hydrochloric acid to the residue; (ii) adding sodium hydroxide to the acid leachate and reacting to precipitate meta titanic acid ($TiO(OH)_2$); and (iii) calcining the metatitanic acid to recover titanium dioxide.

The residue is an intermediate product produced through alkali fusion and contains a large amount of titanium dioxide.

In the case of soda-calcination in related art, each of vanadium and tungsten may be precipitated after being calcined, but there is a problem in that titanium dioxide may not be selectively separated.

The calcination product produced through the alkaline fusion is acid leached to be separated into an alkaline leachate and a residue, and the residue is acid leached again to selectively recover titanium dioxide having high purity.

The acid leaching may be performed at 323 K to 333 K for two hours to three hours.

Based on the temperature being exceeding the above temperature range, unnecessary energy is consumed. The content of titanium discharged by being acid leached is not significantly increased for a period of time exceeding three hours to thereby effectively perform the acid leaching in the above temperature and time range.

The acid leaching may be performed according to Reaction formula 4 below.

$$Na_2TiO_3(s)+2HCl(Aq.) \leftrightarrow TiOCl_2(Aq.)+2NaOH(Aq.)$$

$$Na_2TiO_3(s)+2H_2SO_4(Aq.) \leftrightarrow TiOSO_4(Aq.)+Na_2SO_4(Aq.)+2H_2O \quad \text{[Reaction formula 4]}$$

Sodium hydroxide is added to the acid leachate and reacted to precipitate metatitanic acid.

The above precipitation process may be performed according to following Reaction formula 5.

$$TiOCl_2(Aq.)+2NaOH(Aq.)=TiO(OH)_2(s)+2NaCl(Aq.)$$

$$TiOSO_4(Aq.)+2NaOH(Aq.)=TiO(OH)_2(s)+2Na_2SO_3(Aq.) \quad \text{[Reaction formula 5]}$$

The metatitanic acid has a form of a hydrate of titanium dioxide.

In the step of adding and reacting with the sodium hydroxide, the leaching rate may be 99% or more based on adjustment of the pH to be 2 or less.

Precipitation may be easily carried out in the range of a strong acid, in particular, the leaching rate of titanium dioxide hydrate may be equal to or greater than 99% based on the adjustment to pH 2 or less.

The metatitanic acid may be calcined to recover titanium dioxide.

The calcination process may be carried out according to Reaction formula 6 below.

$$TiO(OH)_2(s) \leftrightarrow TiO_2(s)+H_2O(g) \quad \text{[Reaction formula 6]}$$

The calcination may be carried out at 900 K or more for 5 hours or more, and in that case, titanium dioxide is recovered with 90% or more of purity.

Hereinafter, preferred embodiments are provided to help understanding of the present disclosure, but the following embodiments are merely to illustrate the present disclosure, and the scope of the present disclosure is not limited to the following embodiments.

<Embodiment 1> Selective Valuable Metal Recovery Through Alkali Fusion

Waste denitrification catalyst was prepared and ground, and composition thereof was analyzed using inductively coupled plasma-atomic emission spectroscopy (ICP-AES).

Each of vanadium, tungsten, and titanium in oxide forms was checked and calcination conditions for alkali fusion were derived.

300 g of waste denitrification catalyst was prepared, 1.2 equivalents of sodium hydroxide (NaOH) was added with respect to the waste denitrification catalyst, and 2 equivalents of sodium hydroxide was added with respect to the waste denitrification catalyst to recover titanium, and alkali fusion was performed in the same manner.

The microwave was controlled to output 3 kW of power and alkaline fusion was performed for 20 minutes in the case of 1.2 equivalents of sodium hydroxide and 60 minutes in the case of 2 equivalents of sodium hydroxide.

The alkali fusion was carried out in a temperature range from 900° C. to 1000° C.

After alkali fusion, the alkali leachate and the residue were recovered by adjusting a pulp density to be 20% and water leaching for two hours. An average size of a particle was controlled to be 200 μm or less and it was carried out at room temperatures.

The alkaline leachate contains sodium hydroxide and contains sodium hydroxide having the concentration of 0.50 to 0.75 mol/L, vanadium, and tungsten. Thus, 1.0 to 1.5 equivalents of calcium, in calcium chloride ($CaCl_2$) as a precipitator was added to precipitate.

At this time, in order to determine the precipitation behaviors of vanadium and tungsten with respect to the temperatures, precipitation of the vanadium was completed within 45 minutes at a temperature of 283 K to 312 K, and the precipitation behavior of tungsten was determined after 1 hour at a temperature of 313 K or more to separate and recover each of vanadium and tungsten.

<Embodiment 2> Selective Recovery of Titanium Dioxide

Hydrochloric acid was added to a residue in Example 1, and pH was adjusted to be 2 or less, and reacted at 50° C. for two hours to perform acid leaching. The precipitate obtained by adding sodium hydroxide and precipitating and recovering was calcined at 900 K for five hours to recover titanium dioxide having 90% or more of purity.

<Experimental Example 1> Alkali Fusion Conditions by Addition of Sodium Hydroxide To determine alkali calcination conditions, composition thereof was first analyzed using an ICP-AES.

Figure 3:
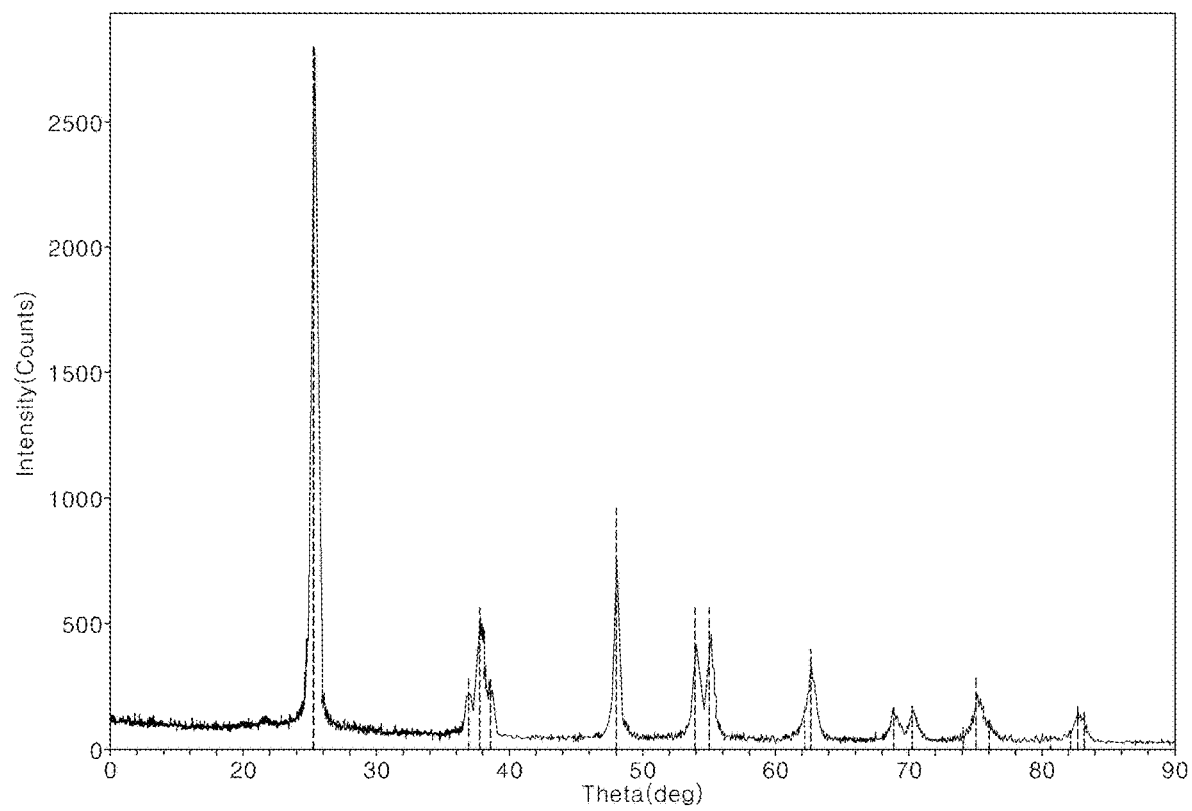
FIG. 3 shows results of X-ray diffraction analysis of a waste denitrification catalyst.

FIG. 3 shows results of X-ray diffraction analysis of a waste denitrification catalyst.

Table 1 shows the composition of the waste denitrification catalyst.

TABLE 1

| $TiO_2$ | $SiO_2$ | $WO_3$ | $Al_2O_3$ | CaO | $V_2O_5$ | $Fe_2O_3$ | MgO | $MoO_3$ | Remainder (wt. %) |
|---|---|---|---|---|---|---|---|---|---|
| 70.9 | 9.80 | 7.73 | 5.57 | 2.50 | 1.23 | 0.77 | 0.55 | 0.10 | 4.5 |

The analysis showed identified valuable metals contained in the waste denitrification catalyst, and in particular, presence of oxide of each of vanadium, tungsten, and titanium.

The conditions to obtain high leaching rates of vanadium and tungsten were determined in order to derive the calcination conditions for alkali fusion to recover vanadium and tungsten.

The amount of added alkali was calculated in accordance with Reaction formula 2 above.

Meanwhile, in the case of titanium, the process was performed under conditions in which $Na_2Ti_3O_7$ is produced in order to minimize the amount of alkali used.

After calcination, calcination products was weighed and ground to perform acid leaching after water leaching.

Figure 4:
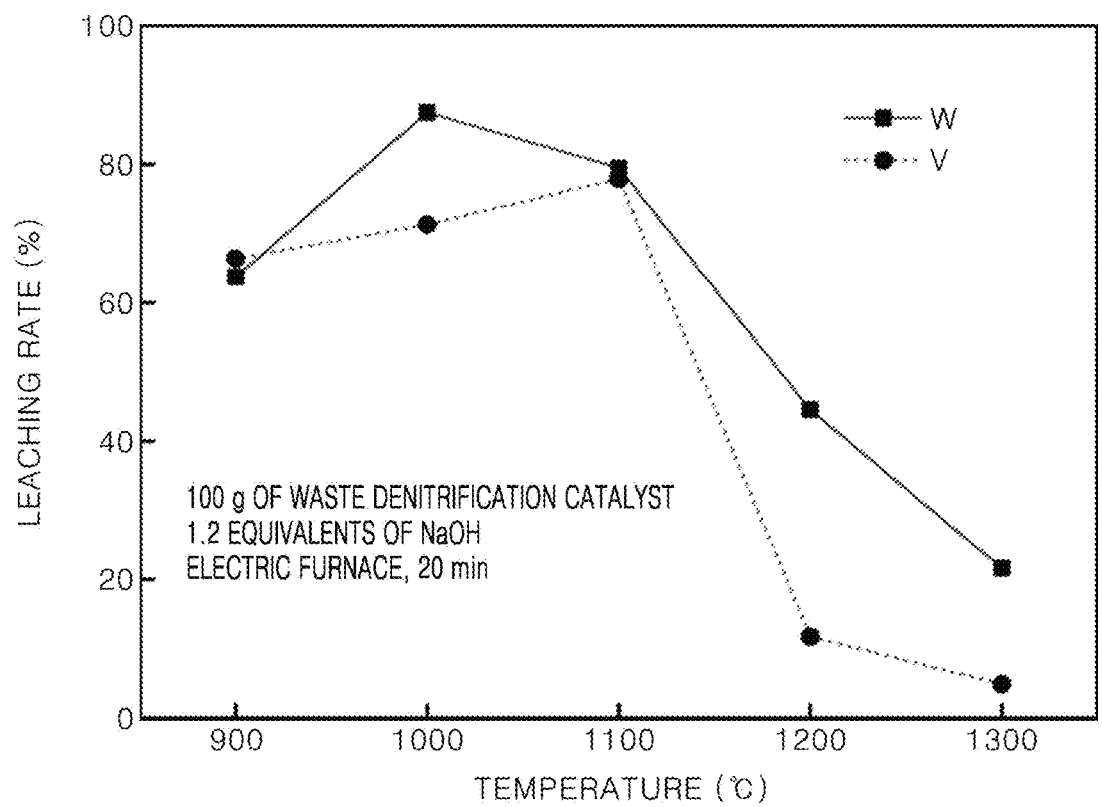
FIG. 4 shows leaching rates of vanadium and tungsten with respect to a calcination temperature during alkaline fusion for 20 minutes in a selective valuable metal recovery method from a waste denitrification catalyst through alkali fusion according to an embodiment of the present disclosure.

FIG. 4 shows leaching rates of vanadium and tungsten with respect to calcination temperatures during alkaline fusion for 20 minutes in a selective valuable metal recovery method from a waste denitrification catalyst through alkali fusion according to an embodiment of the present disclosure.

Figure 5:
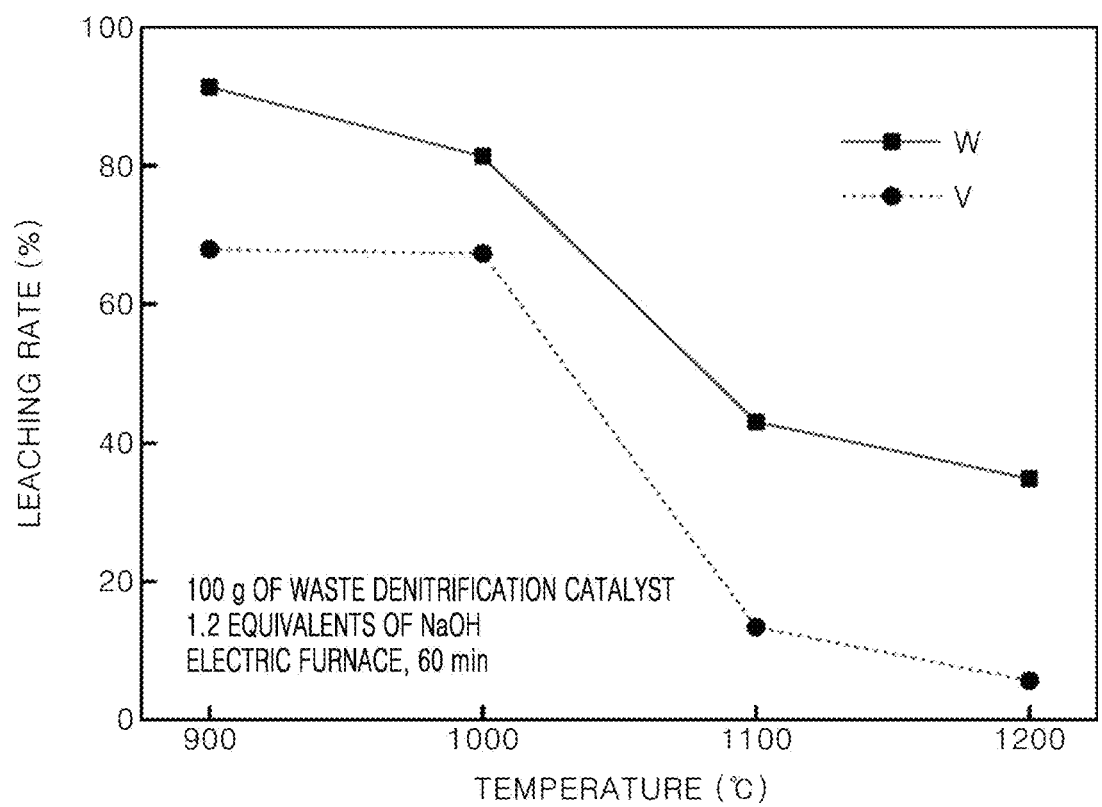
FIG. 5 shows leaching rates of vanadium and tungsten with respect to calcination temperatures during alkaline fusion for 60 minutes in a selective valuable metal recovery method from a waste denitrification catalyst through alkaline fusion according to an embodiment of the present disclosure.

FIG. 5 shows leaching rates of vanadium and tungsten with respect to calcination temperatures during alkaline fusion for 60 minutes in a selective valuable metal recovery method from a waste denitrification catalyst through alkaline fusion according to an embodiment of the present disclosure.

TABLE 2

| Temperature | 20 minutes | | 60 minutes | | |
|---|---|---|---|---|---|
| (° C.) | W | V | W | V | Remark |
| 900 | 63.8 | 66.4 | 91.3 | 68.0 | An amount |
| 1000 | 87.5 | 71.3 | 81.4 | 67.4 | of added |
| 1100 | 79.5 | 77.9 | 43.0 | 13.4 | alkali |
| 1200 | 44.5 | 11.8 | 34.9 | 5.7 | 1:1.2 |
| 1300 | 21.6 | 4.9 | — | — | |

The above Table 2 shows leaching rates of vanadium and tungsten determined by selecting sodium hydroxide as alkali, having 1.2 equivalents of NaOH with respect to the denitrification catalyst, and calcination in an electric furnace for each time and each temperature.

FIGS. 4, 5, and Table 2 show that higher leaching rates of vanadium and tungsten (hereinafter; "W/V") at 1000° C. at 20 minutes of calcination based on the predetermined amount of alkali and a highest W/V leaching rate at 900° C. at 60 minutes of calcination.

Meanwhile, in order to determine the W/V leaching rate with respect to equivalent of sodium hydroxide (NaOH), NaOH having each of 1.2, 1.5, and 2 equivalents was calcined at 900° C. for one hour.

Figure 6:
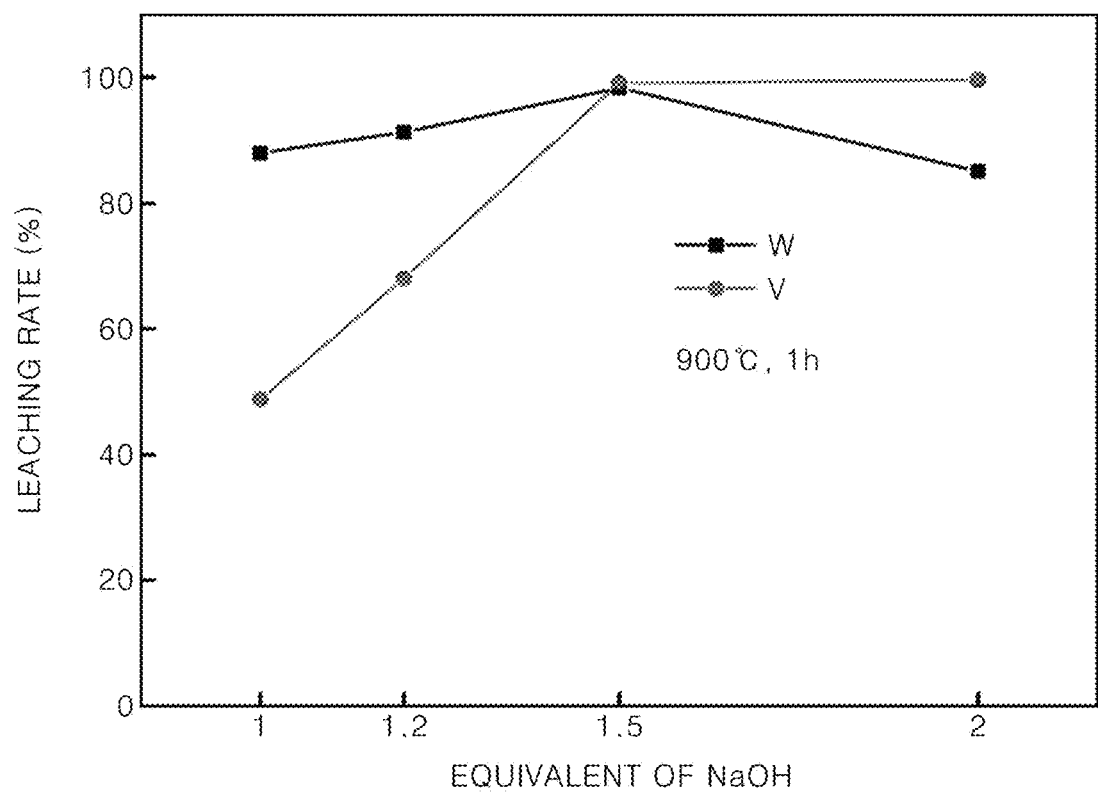
FIG. 6 shows leaching rates of vanadium and tungsten with respect to an equivalent of sodium hydroxide during alkaline fusion in a selective valuable metal recovery method from a waste denitrification catalyst through alkaline fusion according to an embodiment of the present disclosure.

FIG. 6 shows leaching rates vanadium and tungsten with respect to equivalent of sodium hydroxide during alkaline fusion in a selective valuable metal recovery method from a waste denitrification catalyst through alkaline fusion according to an embodiment of the present disclosure.

Referring to FIG. 6, the tungsten leaching rate showed a relatively low leaching rate of 85% in the case of 2 equivalents, but showed a high leaching rate of 91% or more in the case of 1.2 and 1.5 equivalents. Further, it was determined that 1.5 equivalents or more of NaOH was required for leaching vanadium and tungsten from the waste denitrification catalyst when the calcination is performed at 900° C. for one hour.

Therefore, with respect to the calcination conditions for alkali fusion, it was determined that, when 1.2 equivalents of sodium hydroxide was added as the alkali metal, the W/V leaching rate was the highest at 20 minutes of calcination at 1000° C. and at 60 minutes of calcination at 900° C.

When the alkali metal is sodium carbonate ($Na_2CO_3$), changes in the leaching rate were examined based on the calcination time and an amount of $Na_2CO_3$ to determine optimum calcination conditions for leaching W/V.

<Experimental Example 2> Alkali Fusion Conditions by Addition of Sodium Carbonate An effect of changes in equivalent of $Na_2CO_3$ and calcination time on a W/V leaching rate was determined.

TABLE 3

| | 1 | 2 | 3 | 4 | Remark |
|---|---|---|---|---|---|
| Equivalent | 1.2 | 2 | 1.2 | 2 | |
| Time (minutes) | 20 | 20 | 60 | 60 | |

TABLE 3-continued

| | 1 | 2 | 3 | 4 | Remark |
|---|---|---|---|---|---|
| W | 99.8 | 98.6 | 99.2 | 98.5 | leaching rate, % |
| V | 99.6 | 99.4 | 98.6 | 99.1 | |

Above Table 3 shows calcination results of sodium carbonate.

Figure 7:
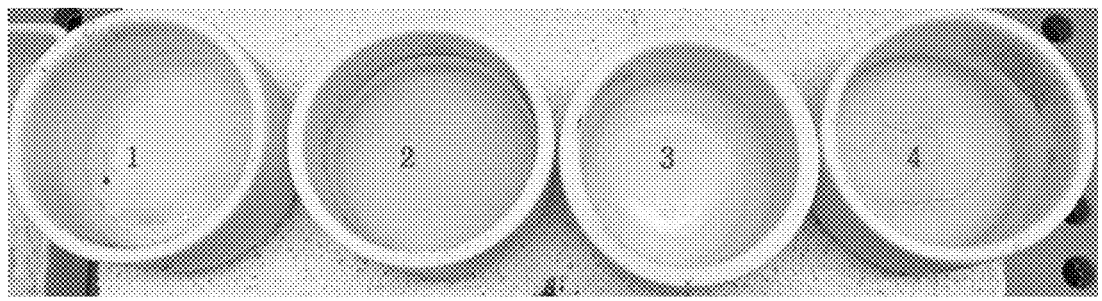
FIG. 7 is a photograph after calcination using sodium carbonate during alkaline fusion in a selective valuable metal recovery method from a waste denitrification catalyst through alkali fusion according to an embodiment of the present disclosure.

FIG. 7 is a photograph after calcination using sodium carbonate during alkaline fusion in a selective valuable metal recovery method from a waste denitrification catalyst through alkali fusion according to an embodiment of the present disclosure.

FIG. 7 shows changes in a state of a calcination material.

Figure 8:
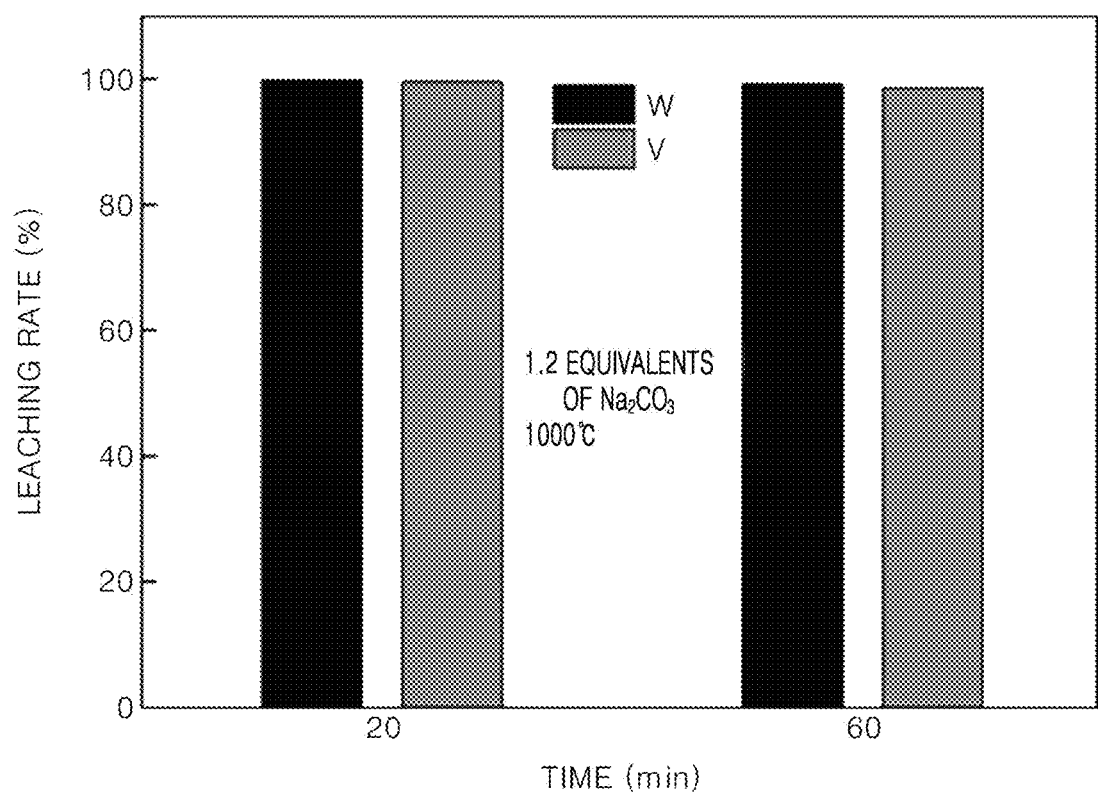
FIG. 8 shows leaching rates of vanadium and tungsten with respect to calcination time determined based on addition of sodium carbonate during alkaline fusion in a selective valuable metal recovery method from a waste denitrification catalyst through alkali fusion according to an embodiment of the present disclosure.

FIG. 8 shows leaching rates of vanadium and tungsten with respect to calcination time determined by adding sodium carbonate during alkaline fusion in a selective valuable metal recovery method from a waste denitrification catalyst through alkali fusion according to an embodiment of the present disclosure.

Figure 9:
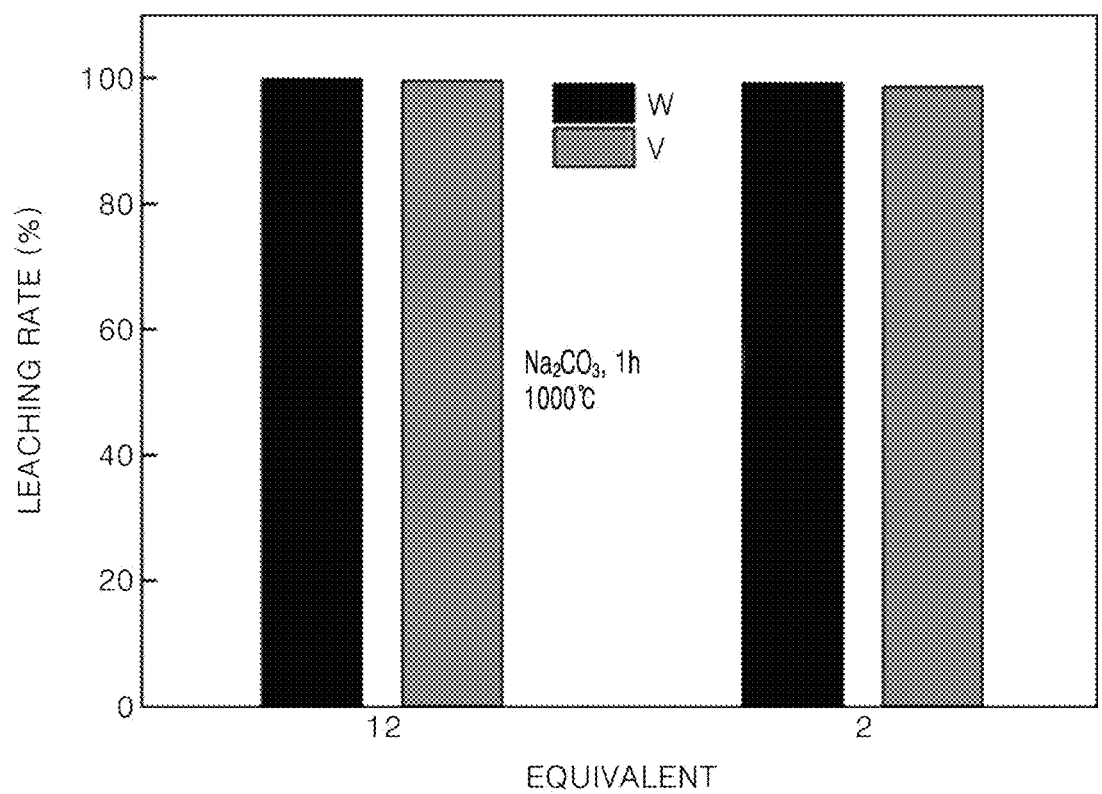
FIG. 9 shows leaching rates of vanadium and tungsten with respect to equivalents of sodium carbonate during alkaline fusion in a selective valuable metal recovery method from a waste denitrification catalyst through alkali fusion according to an embodiment of the present disclosure.

FIG. 9 shows leaching rates of vanadium and tungsten with respect to an equivalent of sodium carbonate during alkaline fusion in a selective valuable metal recovery method from a waste denitrification catalyst through alkali fusion according to an embodiment of the present disclosure.

Referring to FIGS. 7 to 9 and Table 3, it was determined that, when sodium carbonate is added as the alkali metal, optimal conditions correspond to added 1.2 equivalents and calcination for 20 minutes at 1000° C.

<Experimental Example 3> Alkali Fusion Conditions for Titanium Recovery

Two equivalents of alkali required for leaching titanium from a waste denitrification catalyst was added and calcination conditions in the alkali fusion step for recovering titanium (Ti) were determined.

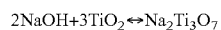

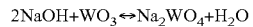

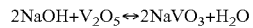 [Reaction formula 7]

According to Reaction formula 7, the amount of added alkali metal was used in 2 equivalents.

When 1.2 equivalents of alkali of alkali metals are added, $TiO_2$ is produced in the form of $Na_2TiO_3$ or $Na_2Ti_3O_7$, which may not be readily leached by acids. The alkali amount for converting the titanium into $Na_8Ti_5O_{14}$ form, which is leached by acids, was found to be 2 equivalents with respect to $Na_2Ti_3O_7$.

Figure 10:
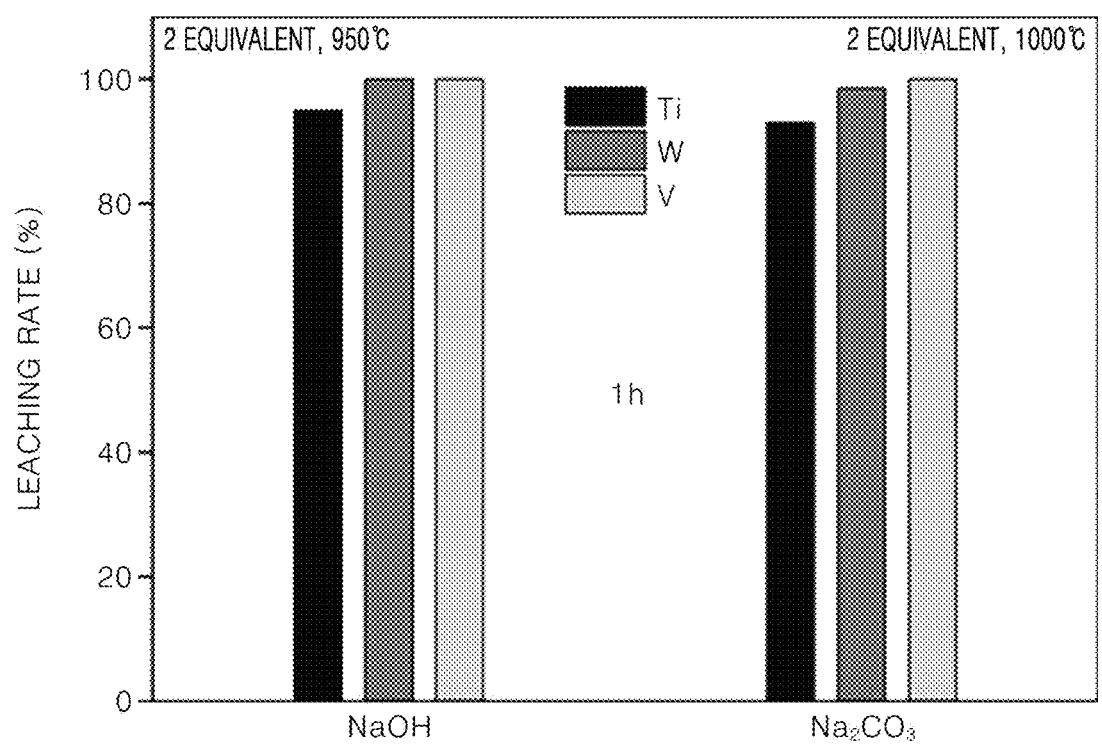
FIG. 10 shows leaching rates of vanadium, tungsten, and titanium with respect to calcination temperatures during alkaline fusion in a selective valuable metal recovery method from a waste denitrification catalyst through alkali fusion according to an embodiment of the present disclosure.

FIG. 10 shows leaching rates of vanadium, tungsten, and titanium with respect to a calcination temperature during alkaline fusion in a selective valuable metal recovery method from a waste denitrification catalyst through alkaline fusion according to an embodiment of the present disclosure.

Referring to FIG. 10, the leaching rate of Ti was 95% when being calcined with NaOH at 950° C. for 1 hour, and the leaching rate of Ti was 93% when being calcined with $Na_2CO_3$ at 1000° C. for 1 hour. At this time, at least 98% or more or W/V was also leached.

Therefore, in the case of alkali fusion by adding sodium hydroxide and sodium carbonate for leaching titanium, vanadium, and tungsten, it was determined that optimal conditions are 2 equivalents of alkali based on the reaction of Reaction formula 7, and calcination at a temperature of 950° C. or more for one hour.

<Experimental Example 4> Alkali Fusion Effect Based on Microwave

Basic experiments were conducted to determine output for an amount of catalyst required for microwave calcination. The basic experiments showed that 100 g of waste denitrification catalyst and 1.2 equivalents of alkali per 1 kW of microwave power were appropriate. Therefore, most of the experiments were conducted under microwave conditions of 3 kW per 300 g of waste denitrification catalyst.

The basic experiment showed temperature changes with respect to time during microwave calcination determined based on greater W/V and Ti leaching rate at about 1000° C.

Figure 11:
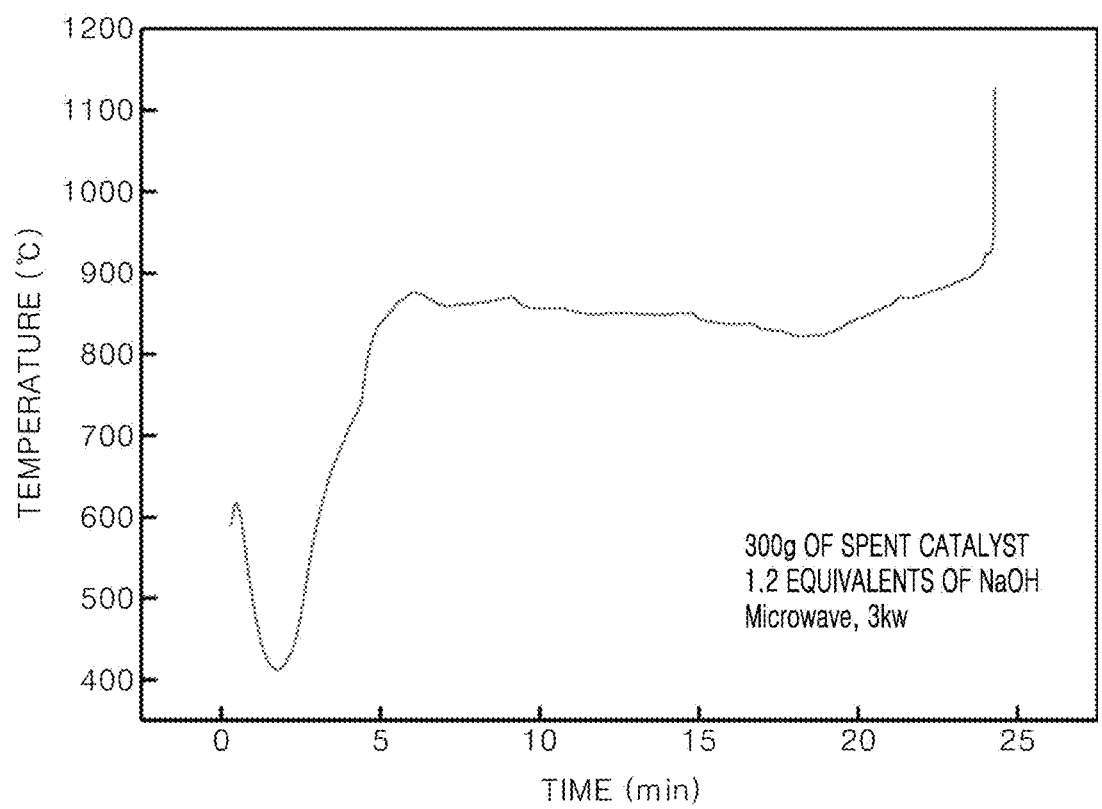
FIG. 11 is a graph showing temperature changes with respect to calcination time during calcination based on microwave.

FIG. 11 is a graph showing changes in temperature with respect to calcination time based on a microwave.

FIG. 11 showed temperatures with respect to time at conditions of 300 g of waste denitrification catalyst, 1.2 equivalents of NaOH, and 3 kW of output of microwave and a temperature reaching about 900° C. at about 5 minutes and being maintained until 25 minutes, and rapidly increasing.

Meanwhile, after determining the temperature of the microwave with respect to time, the W/V leaching rate with respect to microwave calcination time was determined.

Figure 12:
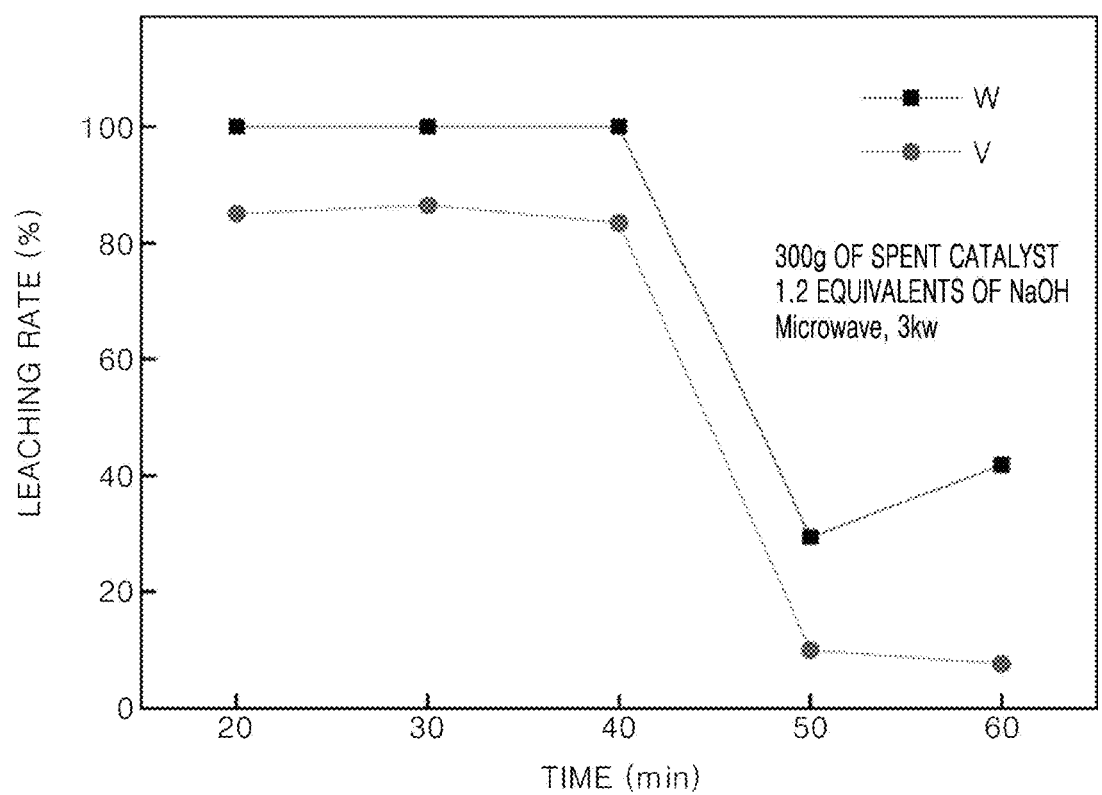
FIG. 12 is a graph showing leaching rates of vanadium and tungsten with respect to a microwave irradiation time when sodium hydroxide is added in a selective valuable metal recovery method from a waste denitrification catalyst through alkali fusion according to an embodiment of the present disclosure.

FIG. 12 is a graph showing leaching rates of vanadium and tungsten with respect to a microwave irradiation time when sodium hydroxide is added in a selective valuable metal recovery method from a waste denitrification catalyst through alkali fusion according to an embodiment of the present disclosure.

To determine a W/V leaching rate with respect to a time with conditions of 300 g of waste denitrification catalyst, 1.2 equivalents of NaOH, and 3 kW of output of a microwave, FIG. 12 showed a tungsten leaching rate close to 100% for only 20 minutes of microwave calcination and a vanadium leaching rate of 85% or more.

From 20 minutes to 40 minutes, the leaching rate was substantially the same, and after 50 minutes, the leaching rate dropped sharply.

The longer the microwave irradiation time is, the higher the temperature of the calcination material is. It is determined that a crystalline structure of the calcination material is changed to a structure to reduce the leaching rate, and thus, the leaching rate is reduced.

In order to determine a degree of W/V leaching with respect to an increase or decrease in an amount of NaOH, the leaching rate with respect to equivalents of NaOH was determined under the same calcination conditions as the conditions to measure the W/V leaching rate with respect to the time.

Figure 13:
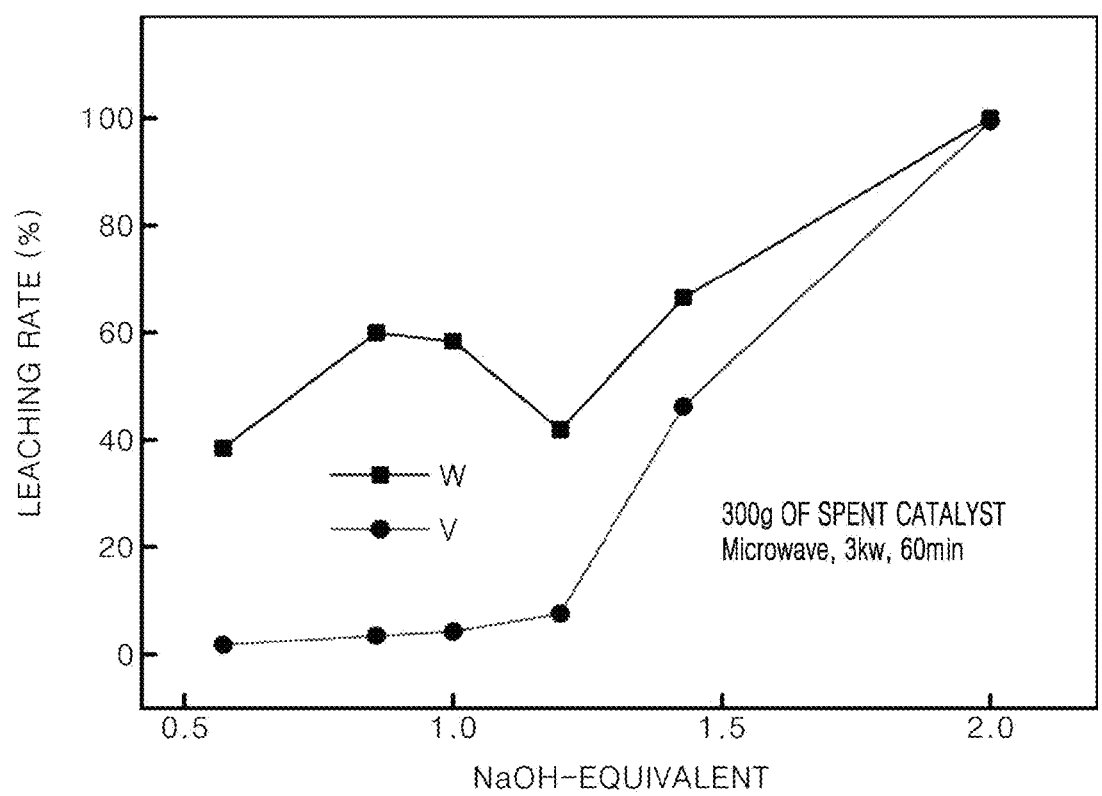
FIG. 13 is a graph showing changes in a leaching rate with respect to equivalents of sodium hydroxide during microwave irradiation in a selective valuable metal recovery method from a waste denitrification catalyst through alkali fusion according to an embodiment of the present disclosure.

FIG. 13 is a graph showing changes in a leaching rate with respect to equivalents of sodium hydroxide during microwave irradiation in a selective valuable metal recovery method from a waste denitrification catalyst through alkali fusion according to an embodiment of the present disclosure.

Referring to FIG. 13, the calcination time is one hour and is not optimal condition when compared to the experimental result of leaching tungsten close to 100% only for 20 minutes, but meaningful results were obtained when Ti is also aimed to be recovered.

It showed the low leaching rate from 0.5 equivalents to 1.5 equivalents similar to the result of the leaching rate with respect to the time, but 99% or more of W/V was leached at 2 equivalents of NaOH.

Therefore, it was determined that optimal conditions for W/V recovery correspond to sodium hydroxide as an alkali metal, the power of the microwave of 3 kW, 1.2 equivalents of the alkali, and calcination for 20 minutes and that optimal conditions for Ti recovery as well as the W/V recovery correspond to 3 kW of power of microwave, 2 equivalents of alkali, and calcination for 60 minutes.

Further, the W/V leaching rate for each microwave output was determined.

Figure 14:
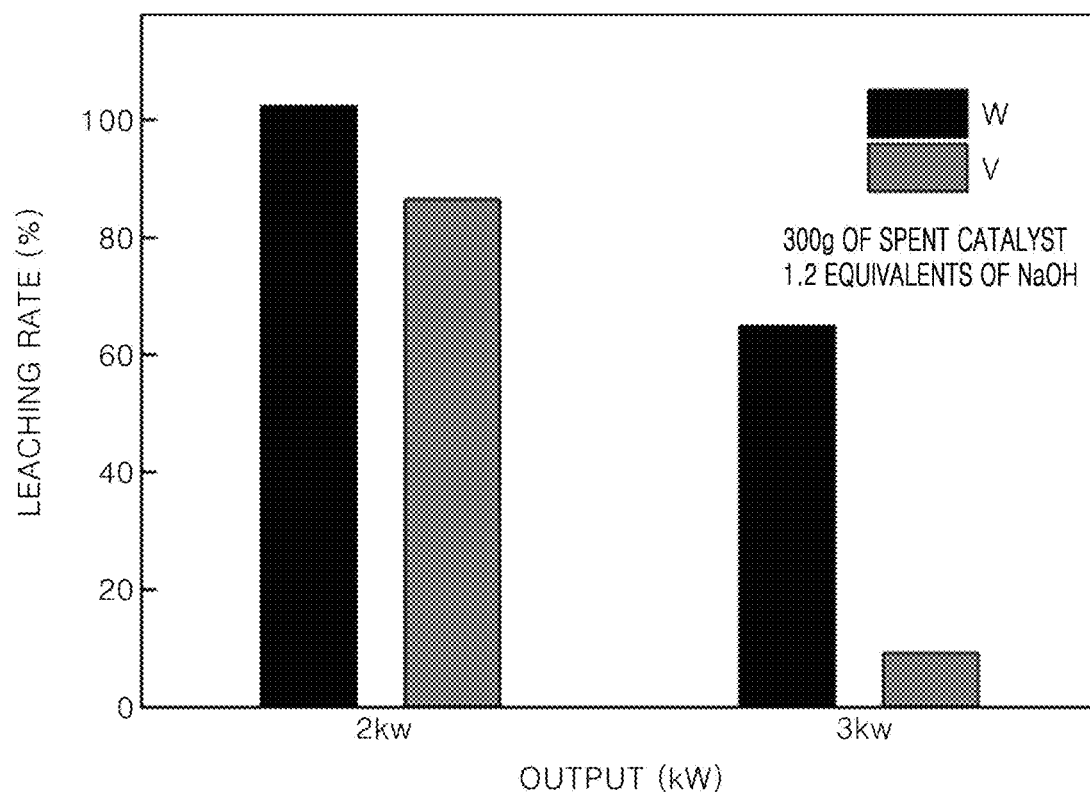
FIG. 14 shows leaching rates of vanadium and tungsten with respect to microwave outputs.

FIG. 14 shows leaching rates of vanadium and tungsten with respect to microwave outputs.

Referring to FIG. 14, a W/V leaching rate is reduced as microwave irradiation is performed for a longer period of time at 3 kW and the W/V leaching rate is greater at 2 kW. It is determined that the temperature was not high enough to affect the reduction in the leaching rate even during irradiation of microwave for one hour due to the low output with respect to the same amount of calcination.

Figure 15:
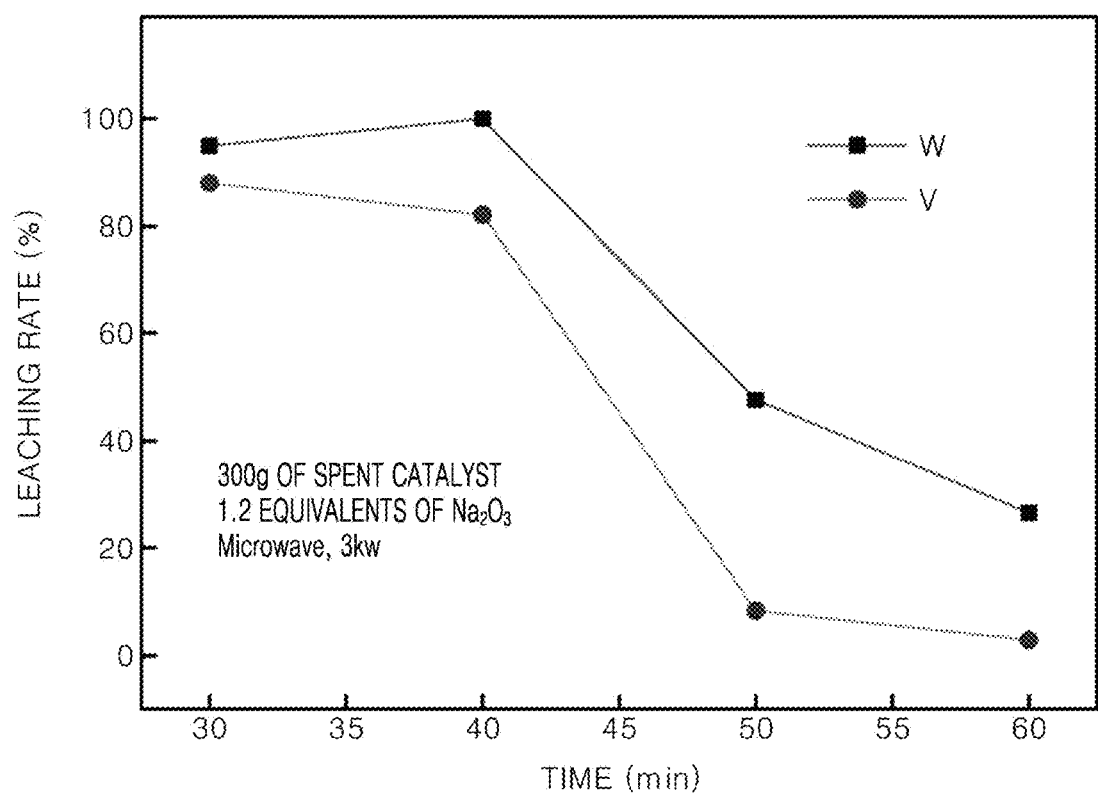
FIG. 15 is a graph showing changes in a leaching rate with respect to equivalent of sodium hydroxide during microwave irradiation in a selective valuable metal recovery method from a waste denitrification catalyst through alkali fusion according to an embodiment of the present disclosure.

FIG. 15 is a graph showing a change in a leaching rate with respect to an equivalent of sodium hydroxide during microwave irradiation in a selective valuable metal recovery method from a waste denitrification catalyst through alkali fusion according to an embodiment of the present disclosure.

Figure 16:
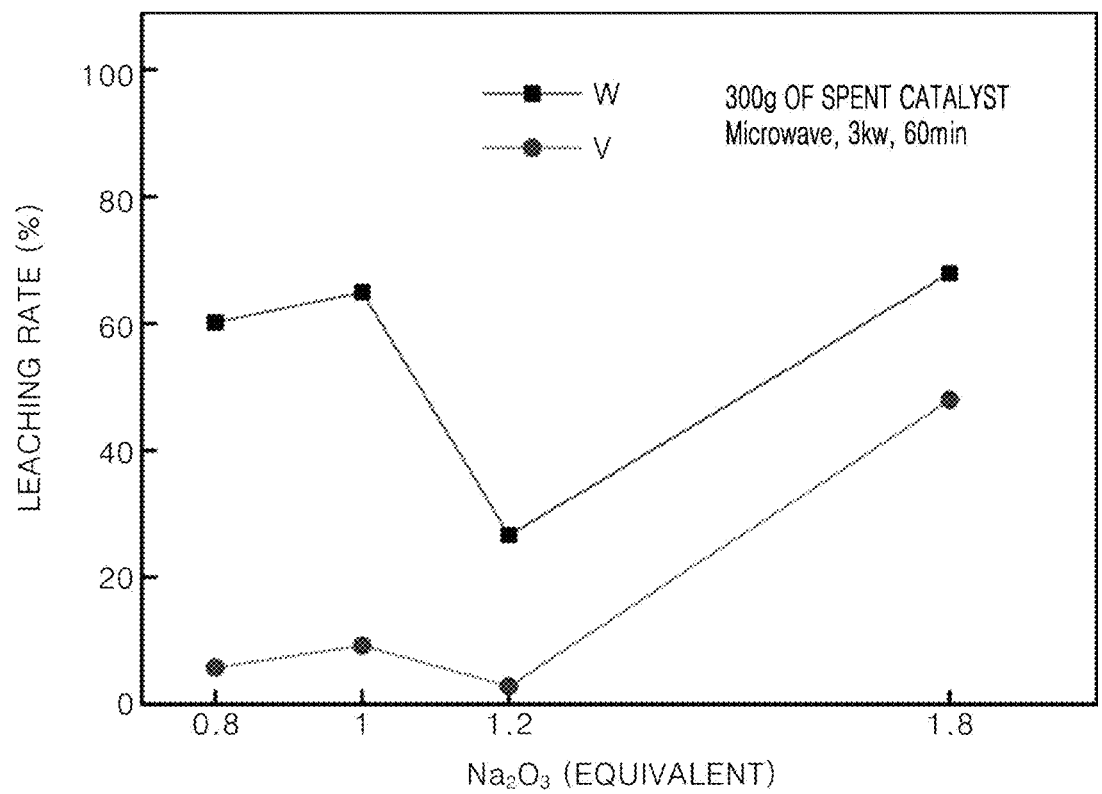
FIG. 16 is a graph showing changes in leaching rates of vanadium and tungsten with respect to equivalents of sodium carbonate in a selective valuable metal recovery method from a waste denitrification catalyst through alkali fusion according to an embodiment of the present disclosure.

FIG. 16 is a graph showing changes in leaching rates of vanadium and tungsten with respect to equivalents of sodium carbonate in a selective valuable metal recovery method from a waste denitrification catalyst through alkali fusion according to an embodiment of the present disclosure.

Referring to FIGS. 15 and 16, the results of hourly calcination under conditions of 3 kW of microwave and 1.2 equivalents of $Na_2CO_3$ showed a same tendency as NaOH. However, it was determined that the W/V leaching rate was highest at 40 minutes that is longer than NaOH by 20 minutes, which corresponds to an optimal calcination time of $Na_2CO_3$, and the leaching rate is sharply reduced after 40 minutes.

Further, it was determined that, with respect to the tendency of changes in the leaching rate with respect to equivalent, the closer 2 equivalents, the greater the W/V leaching rate, like NaOH.

Therefore, it was determined that optimal conditions for vanadium and tungsten recovery correspond to selection of sodium carbonate as the alkali metal, 3 kW of microwave output, 1.2 equivalents thereof, and calcination for 40 minutes. It was determined that optimal conditions for vanadium, tungsten, and titanium recovery correspond to 3 kW of microwave output, 2.0 equivalents, and calcination for 60 minutes.

Selective leaching may be performed based on equivalents of alkali, the calcination temperature, the calcination time, and the microwave power to determine the optimal leaching conditions for each metal.

<Experimental Example 5> Selective Separation of Valuable Metals by Precipitation Vanadium may have 97.5 to 99.1% of leaching rate and tungsten may have 10.6 to 13.6% of leaching rate using $Ca(OH)_2$ in a storing alkali region of pH 13 or higher, and thus, it was predicted that separation between the two metals may be performed by precipitation using calcium.

Calcium vanadate (Ca$_x$V$_y$O$_z$) exists in various types of forms and has different degrees of hydration ranging from pH 0 to pH 12, but no region having pH 12 or greater has been determined. Meanwhile, calcium tungstate (CaWO$_4$) is stable in the pH range of 5 to 14.

In general, the alkaline leachate obtained from the waste denitrification catalyst is a strong alkali solution with pH of 12 or greater, and each of the two metals may be separated by calcium. The precipitation and separation of each of vanadium and tungsten through adding of calcium were performed through definition of properties of precipitation behaviors of vanadium and tungsten in the storing alkali region.

In this case, it may be an efficient separation process because it is relatively economical in time and cost compared to a solvent extraction method and an ion exchange method.

First, the experiment was performed using a simulated solution for accurate pH control in the strong alkali region. The simulated solution was prepared by dissolving NaVO$_3$ and NaWO$_4$·2H$_2$O in NaOH solution and using 1 g/L of vanadium and 10 g/L of tungsten based on contents of vanadium and tungsten in the waste denitrification catalyst.

Precipitator CaCl$_2$ was used, and was prepared with 4 mol/L to prevent dilution of each of vanadium and tungsten due to a large amount of added CaCl$_2$. 1 equivalent of calcium corresponds to 2.57 g/L, which is used for the precipitation reaction of 1 g/L of vanadium and 10 g/L of tungsten, and the amount of added calcium was calculated as 1 equivalent based on the sum of amount of calcium used for the precipitation of vanadium and tungsten by the following Reaction formula 8.

2NaVO$_3$(aq)+CaCl$_2$(aq)→Ca(VO$_3$)$_2$(s)↓+2NaCl(aq)

Na$_2$WO$_4$(aq)+CaCl$_2$(aq)→CaWO$_4$(s)↓+
    2NaCl(aq)         [Reaction formula 8]

A constant temperature circulating water tank and a Pyrex double jacketed reactor were used as experimental apparatuses, and it was stirred with a cross magnetic bar of 2.5×2.5 mm. The precipitation behaviors of vanadium and tungsten was investigated for 2 hours by adjusting the amount of added calcium (Ca), a concentration of NaOH solution, a stirring speed, and a reaction temperature.

Experimental results are shown by calculating the leaching rate based on analysis of the concentrations of vanadium and tungsten using ICP-AES (ICAP6300 DUO, Thermo).

The influence of the stirring speed was first determined.

Figure 17:
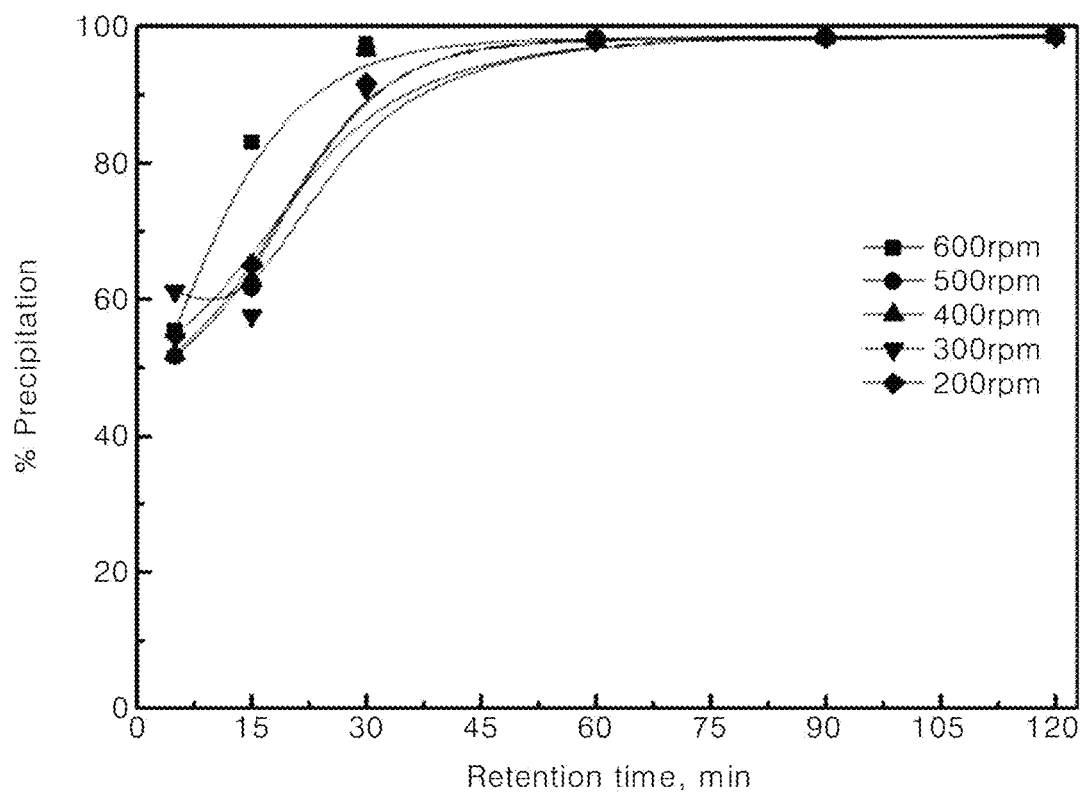
FIG. 17 is a graph showing precipitation behavior of vanadium determined based on changes in a stirring speed in a selective valuable metal recovery method from a waste denitrification catalyst through alkali fusion according to an embodiment of the present disclosure.

FIG. 17 is a graph showing precipitation behavior of vanadium based on changes in a stirring speed in a selective valuable metal recovery method from a waste denitrification catalyst through alkali fusion according to an embodiment of the present disclosure.

Figure 18:
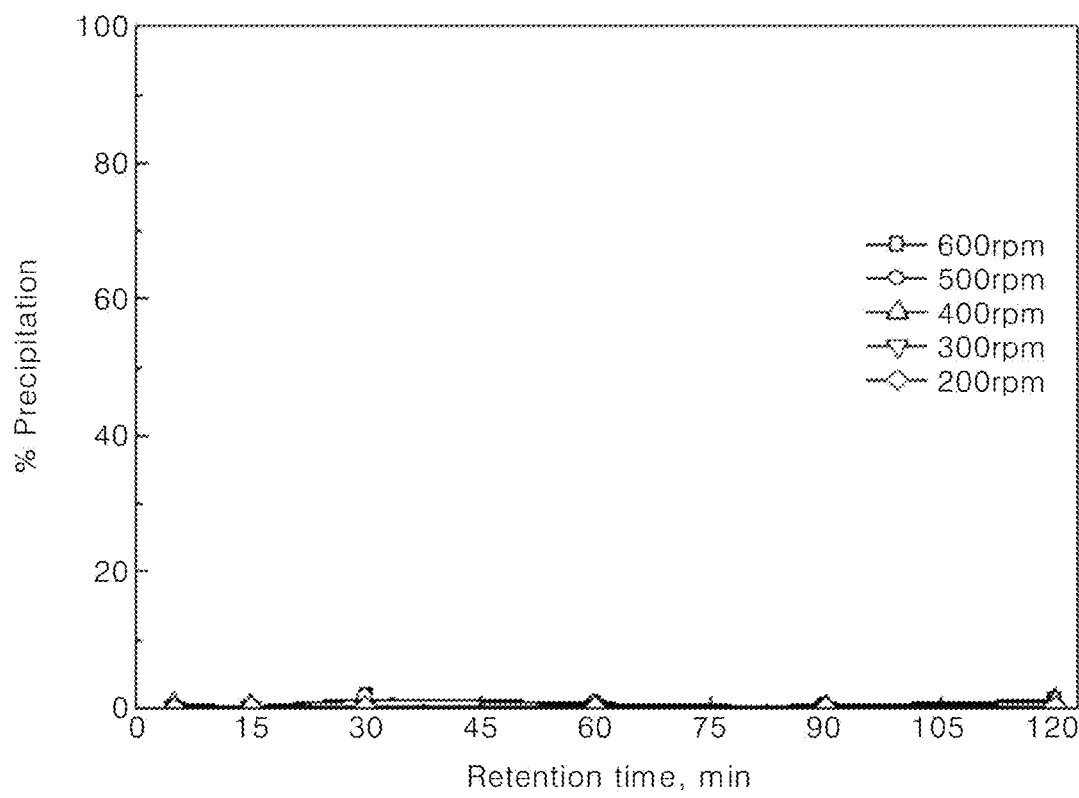
FIG. 18 is a graph showing precipitation behavior of tungsten determined based on changes in a stirring speed in a selective valuable metal recovery method from a waste denitrification catalyst through alkali fusion according to an embodiment of the present disclosure.

FIG. 18 is a graph showing precipitation behavior of tungsten based on changes in a stirring speed in a selective valuable metal recovery method from a waste denitrification catalyst through alkali fusion according to an embodiment of the present disclosure.

FIGS. 17 and 18 show 98.4 to 98.7% of vanadium and 0.2 to 1.2% of tungsten, and accordingly, an influence of the stirring rate on a precipitation reaction rate was determined to be insignificant. Subsequent experiments were performed with fixed stirring speed of 500 rpm.

Influence of amount of added calcium and concentration of sodium hydroxide was determined.

Precipitation experiments were performed at room temperatures for two hours by adding Ca corresponding to 0.5 to 1.5 equivalents of each of vanadium and tungsten to a 0.1 to 1.0 mol/L of NaOH solution containing vanadium and tungsten.

Figure 19:
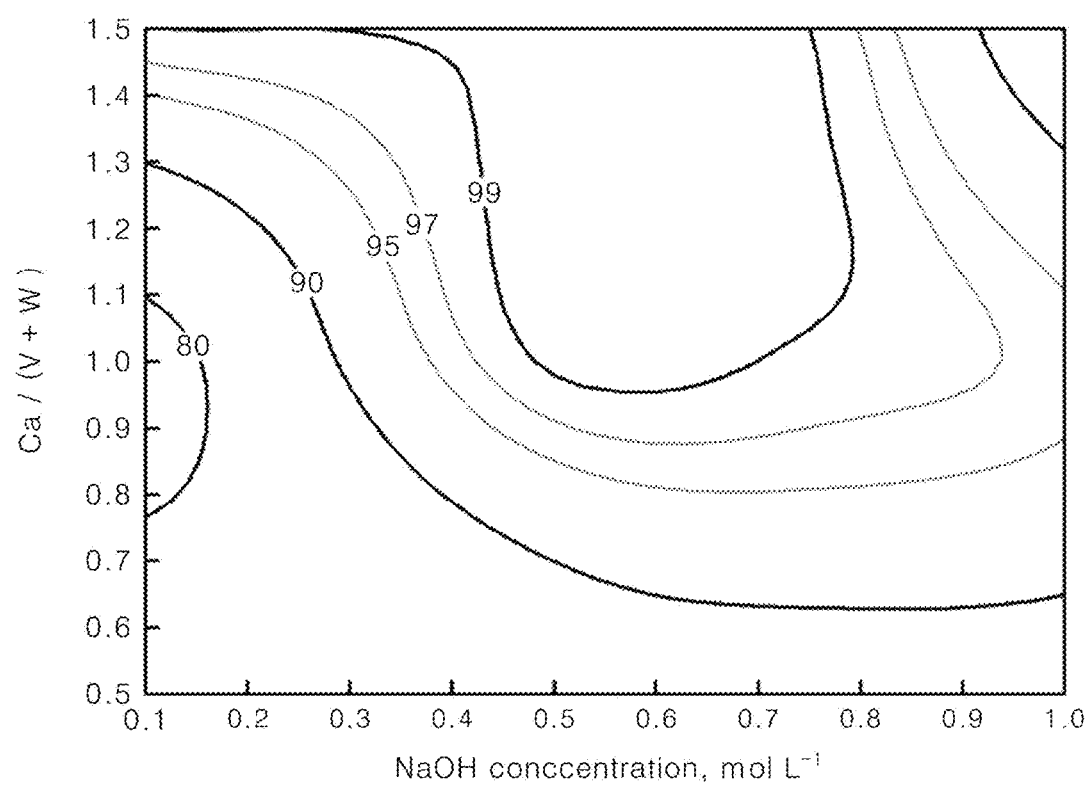
FIG. 19 is a graph showing a precipitation rate of vanadium with respect to a concentration of sodium hydroxide and an amount of added calcium in a selective valuable metal recovery method from a waste denitrification catalyst through alkali fusion according to an embodiment of the present disclosure.

FIG. 19 is a graph showing a precipitation rate of vanadium with respect to a concentration of sodium hydroxide and an amount of added calcium in a selective valuable metal recovery method from a waste denitrification catalyst through alkali fusion according to an embodiment of the present disclosure.

Referring to FIG. 19, vanadium showed 80% or more of leaching rate with respect to the concentration of NaOH solution and an amount of added Ca within experimental conditions. It showed 99% or more of leaching rate under conditions of addition of 1.0 to 1.5 equivalents of Ca into 0.50 to 0.75 mol/L of NaOH solution.

Figure 20:
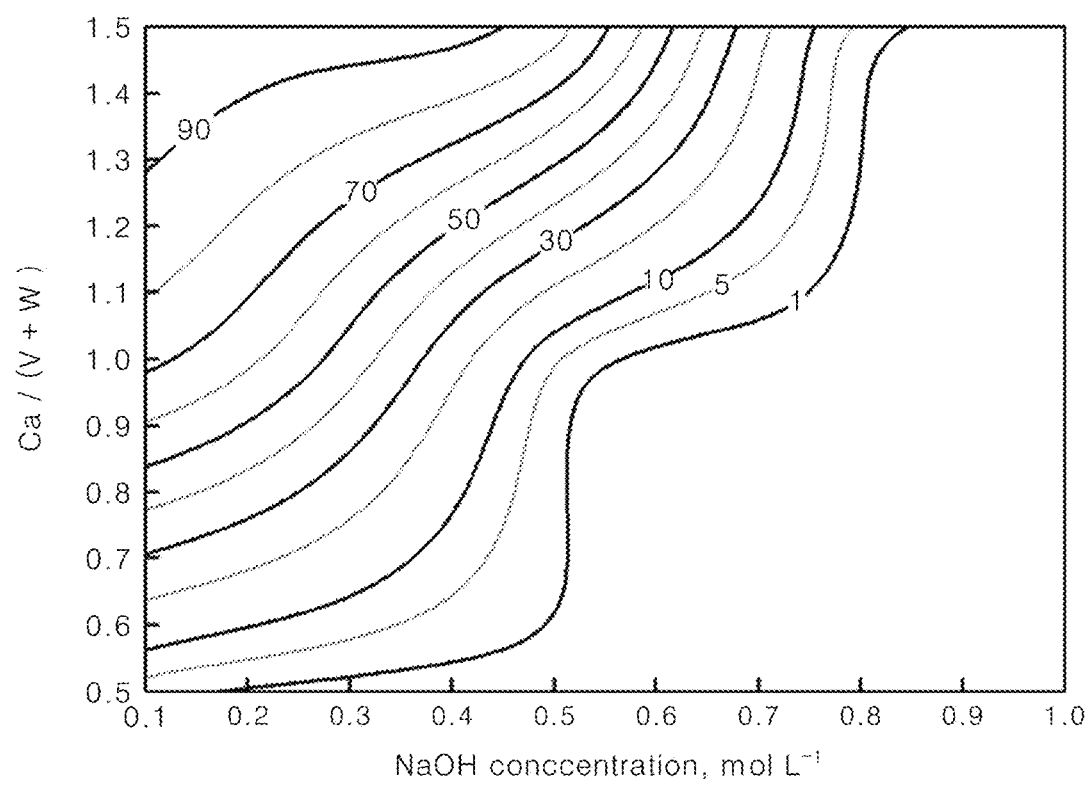
FIG. 20 is a graph showing a precipitation rate of tungsten with respect to a concentration of sodium hydroxide and an amount of added calcium in a selective valuable metal recovery method from a waste denitrification catalyst through alkali fusion according to an embodiment of the present disclosure.

FIG. 20 is a graph showing a precipitation rate of tungsten with respect to a concentration of sodium hydroxide and an amount of added calcium in a selective valuable metal recovery method from a waste denitrification catalyst through alkali fusion according to an embodiment of the present disclosure.

Referring to FIG. 20, the higher the NaOH concentration and the smaller the amount of Ca added, the lower the leaching rate. In particular, it showed a leaching rate of 1% or less under conditions of the Ca addition of 1.0 equivalent or less into NaOH solution of 0.5 mol/L or more.

Figure 21:
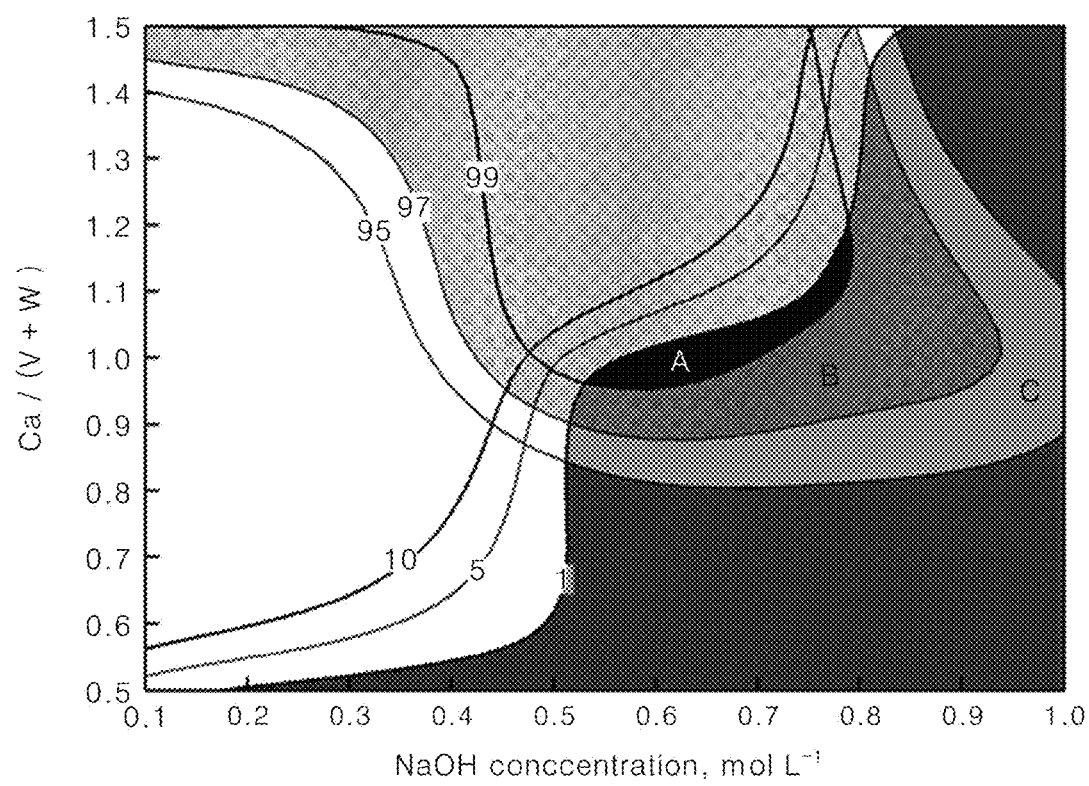
FIG. 21 is a graph showing precipitation behaviors of vanadium and tungsten with respect to a concentration of sodium hydroxide in a selective valuable metal recovery method from a waste denitrification catalyst through alkali fusion according to an embodiment of the present disclosure.

FIG. 21 is a graph showing precipitation behaviors of vanadium and tungsten with respect to a concentration of sodium hydroxide in a selective valuable metal recovery method from a waste denitrification catalyst through alkaline fusion according to an embodiment of the present disclosure.

When the separation conditions of each of vanadium and tungsten are determined with reference to FIG. 21, conditions may be determined in which the conditions in which a precipitation area of 99% or more of vanadium and a precipitation area of 10% or less of tungsten are overlapped with each other.

Area A is a precipitation area in which 99% or more of vanadium is precipitated and 1% or less of tungsten is precipitated. Area A+B refers to a precipitation area in which 97% or more of vanadium is precipitated and 1% or less of tungsten is precipitated. Area A+B+C refers to a precipitation area in which 95% or more of vanadium and 1% or less of tungsten are precipitated.

Therefore, it was determined that vanadium and tungsten could be recovered separately based on the concentration of sodium hydroxide.

Subsequently, the effect of temperature was determined.

1 equivalent of Ca was added to a 0.75 mol/L of NaOH solution containing vanadium and tungsten to determine the precipitation behaviors of vanadium and tungsten with respect to temperatures with conditions of 283 to 353 K.

Figure 22:
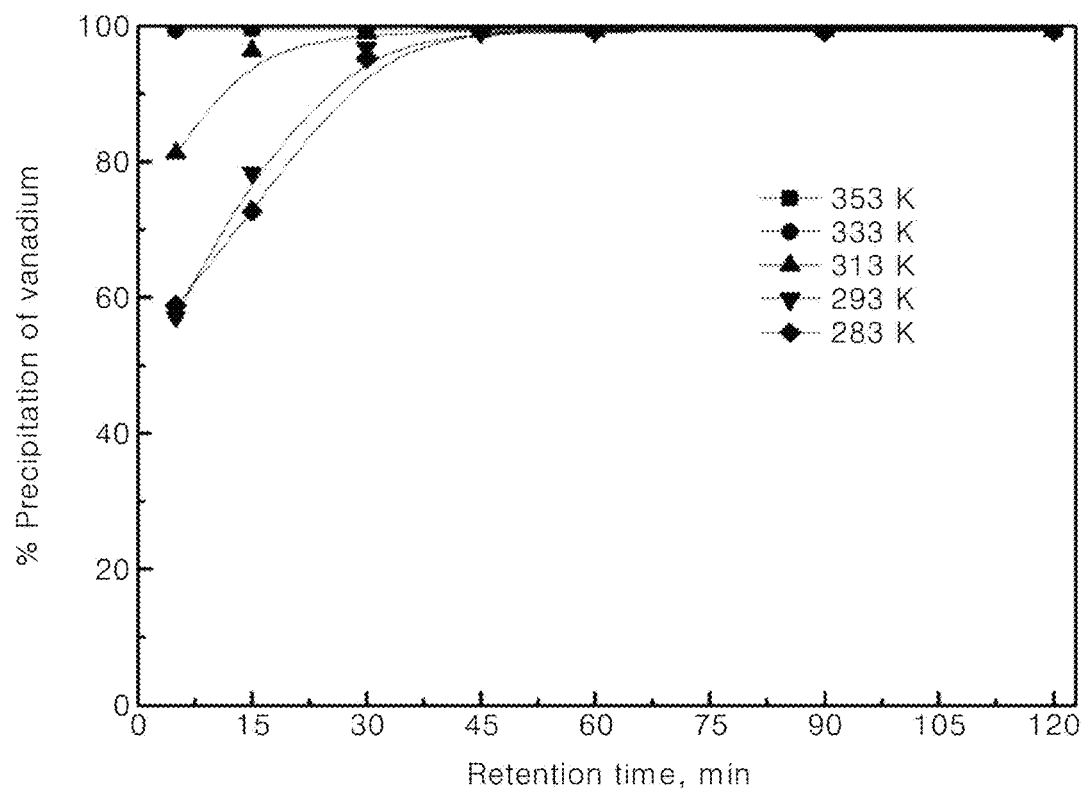
FIG. 22 is a graph showing precipitation behavior of vanadium determined based on a temperature in a selective valuable metal recovery method from a waste denitrification catalyst through alkali fusion according to an embodiment of the present disclosure.

FIG. 22 is a graph showing precipitation behavior of vanadium with temperature in a selective valuable metal recovery method from a waste denitrification catalyst through alkali fusion according to an embodiment of the present disclosure.

Referring to FIG. 22, it showed a tendency in which the higher the temperature, the faster the precipitation reaction rate.

Precipitation reaction was completed within 45 minutes at 283 to 313 K, and within 15 minutes above 333 K.

Figure 23:
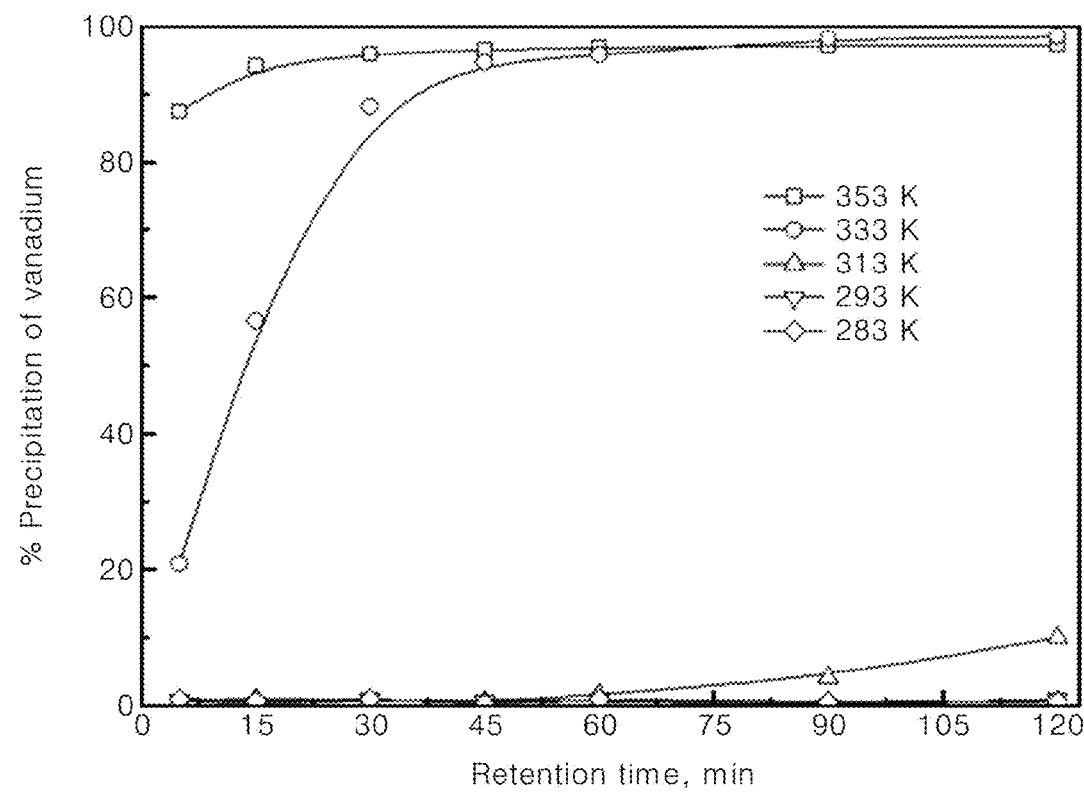
FIG. 23 is a graph showing precipitation behavior of tungsten determined based on a temperature in a selective valuable metal recovery method from a waste denitrification catalyst through alkali fusion according to an embodiment of the present disclosure.

FIG. 23 is a graph showing precipitation behavior of tungsten with respect to a temperature in a selective valuable metal recovery method from a waste denitrification catalyst through alkaline fusion according to an embodiment of the present disclosure.

Referring to FIG. 23, the precipitation reaction did not occur at a temperature of the room temperature (293 K) or less, but the precipitation reaction began to occur after one hour at the temperature of 313 K or more, and showed a leaching rate of 10.0% after the completion of the reaction for 2 hours.

Further, it started being precipitated together with vanadium at 333 K or more and the leaching rate was 98.5% at 333 K and 97.2% at 353 K after completion of the reaction.

Therefore, the separation efficiency of each of vanadium and tungsten is significantly degraded as the temperature is increased. In other words, it was determined that each of vanadium and tungsten may be separated at room temperatures due to the difference in precipitation reaction rate.

It was also determined that, with respect to tungsten, $CaWO_4$ did not be precipitated at room temperature (293 K) or lower, but $CaWO_4$ was precipitated as the temperature was increased.

Figure 24:
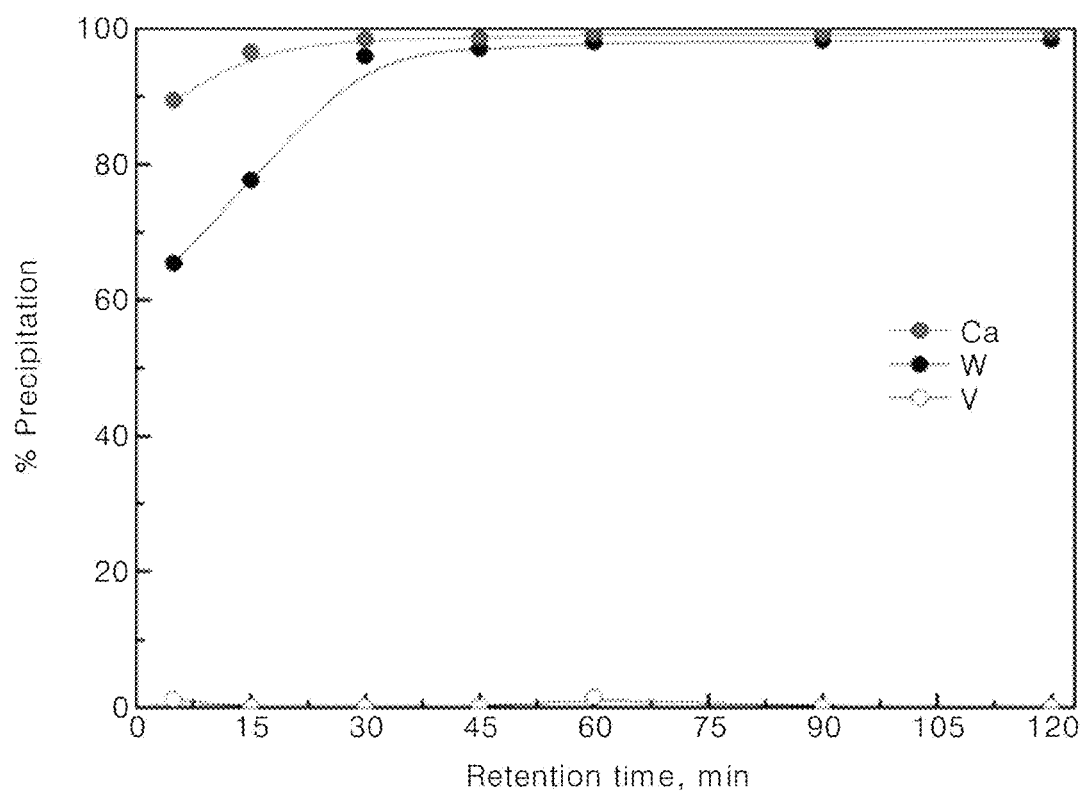
FIG. 24 is a graph showing precipitation behaviors of calcium, vanadium, and tungsten with respect to a retention time at room temperatures in a selective valuable metal recovery method from a waste denitrification catalyst through alkali fusion according to an embodiment of the present disclosure.

FIG. 24 is a graph showing precipitation behaviors of calcium, vanadium, and tungsten with respect to a retention time at room temperatures in a selective valuable metal recovery method from a waste denitrification catalyst through alkaline fusion according to an embodiment of the present disclosure.

Referring to FIG. 24, it was determined that calcium and vanadium has a faster precipitation reaction speed than that of tungsten. Therefore, the vanadium in the precipitated calcium solution completed the precipitation in a short time by the following Reaction formula 9.

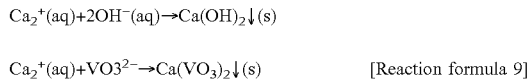

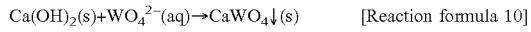  [Reaction formula 9]

It was determined that tungsten has a lower reaction speed than that of vanadium and participates in a solid-liquid reaction, and thus, tungsten has a low precipitation speed, in contrast to vanadium that participates in a liquid-liquid reaction, based on the reaction with $Ca(OH)_2$ as described in the following Reaction formula 10.

$$Ca(OH)_2(s) + WO_4^{2-}(aq) \rightarrow CaWO_4 \downarrow (s)$$  [Reaction formula 10]

Therefore, it was determined that the separation behaviors of vanadium and tungsten in the strong alkali region were affected by the concentration of NaOH solution, the amount of added Ca, and the temperature. The conditions may be determined in which the precipitation area of 95% or more of vanadium and the precipitation area of 1% or less of tungsten are overlapped with each other. Thus, the precipitation area may be selected based on required final metal class and purity improved through a subsequent process.

Experiments to investigate the effect of temperature showed that vanadium was precipitated as $Ca(VO_3)_2$ at room temperatures based on the precipitation reaction rate of vanadium and tungsten, and tungsten was left in solution to separate the two metals.

The present disclosure has been described with respect to specific embodiments with respect to the selective valuable metal recovery method from the waste denitrification catalyst through alkali fusion, but it is obvious that various modifications can be made within a range that does not deviate from the scope of the present disclosure.

Therefore, the scope of the present disclosure may not be limited to the embodiments described, but may be defined by the claims below and equivalents thereof.

Thus, it is clear that the above-described embodiments are illustrative in all aspects and do not limit the present disclosure. The scope of the disclosure is defined by the following claims rather than the detailed description. It may be understood that meaning and scope of claims, and modifications and changes derived from equivalents thereof are included in the scope of the present disclosure.

The invention claimed is:

1. A method for selectively recovering valuable metals from a waste denitrification catalyst through alkali fusion, the method comprising:
    (a) adding an alkali metal to the waste denitrification catalyst, followed by mixing and alkali fusion, to generate a calcination product;
    (b) subjecting the calcination product to water-leaching to recover an alkali leachate and a residue;
    (c) adding a precipitator to the alkali leachate, followed by stirring, to recover calcium metavanadate ($Ca(VO_3)_2$) and calcium tungstate ($CaWO_4$) through precipitation; and
    (d) when the calcium tungstate is recovered in step (c), subjecting the recovered calcium tungstate to acid decomposition to prepare tungstic acid,
        wherein the method further comprising:
            recovering the residue of step (b), and
            (i) acid-leaching by adding sulfuric acid or hydrochloric acid to the residue;
            (ii) adding sodium hydroxide to the acid leachate to precipitate metatitanic acid (TiO(OH)2); and
            (iii) calcining the metatitanic acid to recover titanium dioxide.

2. The method for selectively recovering the valuable metals from the waste denitrification catalyst through the alkali fusion of claim 1, wherein the alkali metal is sodium carbonate ($Na_2CO_3$) or sodium hydroxide (NaOH).

3. The method for selectively recovering the valuable metals from the waste denitrification catalyst through the alkali fusion of claim 1, wherein, during alkali fusion, calcination is performed at an output of 1 kW per 100 g of the waste denitrification catalyst using a microwave.

4. The method for selectively recovering the valuable metals from the waste denitrification catalyst through the alkali fusion of claim 1, wherein, during the alkali fusion, the calcination is performed for 20 to 60 minutes at 900° C. to 1000° C.

5. The method for selectively recovering the valuable metals from the waste denitrification catalyst through the alkali fusion of claim 1, wherein the precipitator is calcium chloride ($CaCl_2$).

6. The method for selectively recovering the valuable metals from the waste denitrification catalyst through the alkali fusion of claim 1, wherein the precipitator is added and a strong alkaline calcium hydroxide [$Ca(OH)_2$] is further added to adjust pH.

7. The method for selectively recovering the valuable metals from the waste denitrification catalyst through the alkali fusion of claim 1, wherein stirring after addition of the precipitator is performed at 200 to 600 rpm for 30 minutes to 2 hours.

8. The method for selectively recovering the valuable metals from the waste denitrification catalyst through the alkali fusion of claim 5, wherein, when the alkali metal is sodium hydroxide and the sodium hydroxide in the alkali leachate has a concentration of 0.5 to 0.75 mol/L, 1.0 to 1.5 equivalents of the calcium precipitator are added to precipitate calcium metavanadate with a precipitation efficiency of 99% or more, wherein the 1 equivalent the calcium precipitator is a sum of amount of calcium precipitator used for the precipitation of vanadium and tungsten by the following Reaction formula 8:

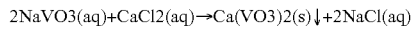

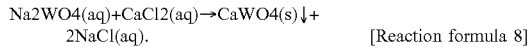     [Reaction formula 8]

9. The method for selectively recovering the valuable metals from the waste denitrification catalyst through the alkali fusion of claim 1, wherein, when the alkali metal is sodium hydroxide and sodium hydroxide in the alkaline leachate has a concentration of 0.5 to 1.0 mol/L, 0.5 to 1.0 equivalent of the calcium precipitator are added to precipitate calcium tungstate with 1% or less of a recovery rate,
wherein the 1 equivalent the calcium precipitator is a sum of amount of calcium precipitator used for the precipitation of vanadium and tungsten by the following Reaction formula 8:

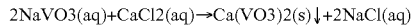

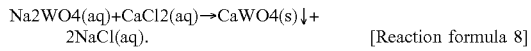     [Reaction formula 8]

10. The method for selectively recovering the valuable metals from the waste denitrification catalyst through the alkali fusion of claim 1, wherein
the precipitator is added to the alkaline leachate, stirred to be reacted,
the reaction is performed at 333 K to 353 K for 15 minutes or less to precipitate calcium metavanadate, and
calcium tungstate is precipitated by reacting at 313 K to 353 K for one hour to two hour.

11. The method for selectively recovering the valuable metals from the waste denitrification catalyst through the alkali fusion of claim 1, wherein the acid leaching is performed for two or three hours at 323 K to 333 K.

12. The method for selectively recovering the valuable metals from the waste denitrification catalyst through the alkali fusion of claim 1, wherein a leaching rate is 99% or more by adjusting pH to be 2 or less in the step of adding and reacting the sodium hydroxide.

13. The method for selectively recovering the valuable metals from the waste denitrification catalyst through the alkali fusion of claim 1, wherein the calcination of step (iii) is performed for four to five hours at 850 K to 900 K.

* * * * *